(12) United States Patent
Hamada et al.

(10) Patent No.: US 6,234,015 B1
(45) Date of Patent: May 22, 2001

(54) FLOW RATE MEASURING DEVICE

(75) Inventors: Shingo Hamada; Tomoya Yamakawa; Fumiyoshi Yonezawa; Hiroyuki Uramachi; Takeharu Oshima; Satoru Kotoh, all of Toyko (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/285,037

(22) Filed: Apr. 1, 1999

(30) Foreign Application Priority Data

Apr. 2, 1998 (JP) .................................................. 10-090119

(51) Int. Cl.[7] ...................................................... G01F 1/68
(52) U.S. Cl. ...................................... 73/202.5; 73/204.22
(58) Field of Search ............................... 73/118.2, 202.5, 73/202, 204.22

(56) References Cited

U.S. PATENT DOCUMENTS 5,355,726 * 10/1994 Zurek et al. ..................... 73/202.5
5,696,321 * 12/1997 Igarashi et al. ................... 73/202.5

FOREIGN PATENT DOCUMENTS

| 44 07 209 | 9/1995 | (DE) . |
| 55-109921 | 8/1980 | (JP) . |
| 604813 | 1/1985 | (JP) . |
| 9-145439 | 6/1997 | (JP) . |

* cited by examiner

Primary Examiner—Harshad Patel
(74) Attorney, Agent, or Firm—Leydig, Voit & Mayer, Ltd.

(57) ABSTRACT

A flow rate measuring device includes a flow rate measuring duct for placement in a primary passage for a fluid, extending substantially parallel to the primary passage, and a flow rate detector in the flow rate measuring duct for measuring a flow rate of the fluid in the primary passage, the flow rate measuring duct having a downstream wall including a notch or a through hole. The downstream wall may include an air-permeable member. The flow rate measuring device may include a projection on an outer wall of the flow rate measuring duct upstream of the notch, through hole, or air-permeable member, the projection extending in a circumferential direction with respect to the flow rate measuring duct.

10 Claims, 24 Drawing Sheets

F I G. 7
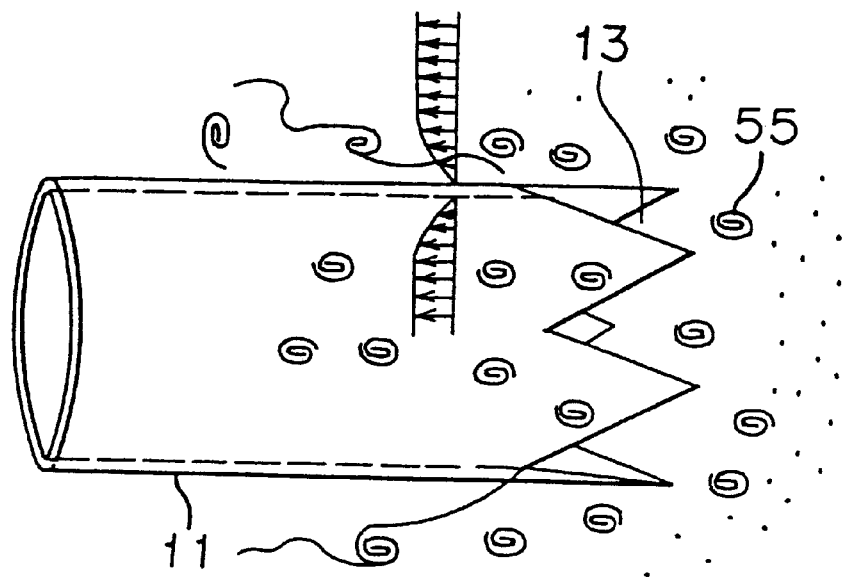
F I G. 8
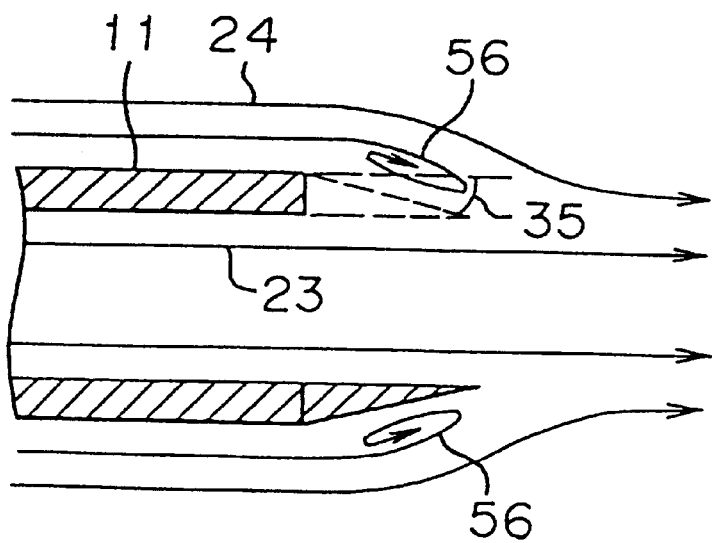

FIG. 32 (a) PRIOR ART
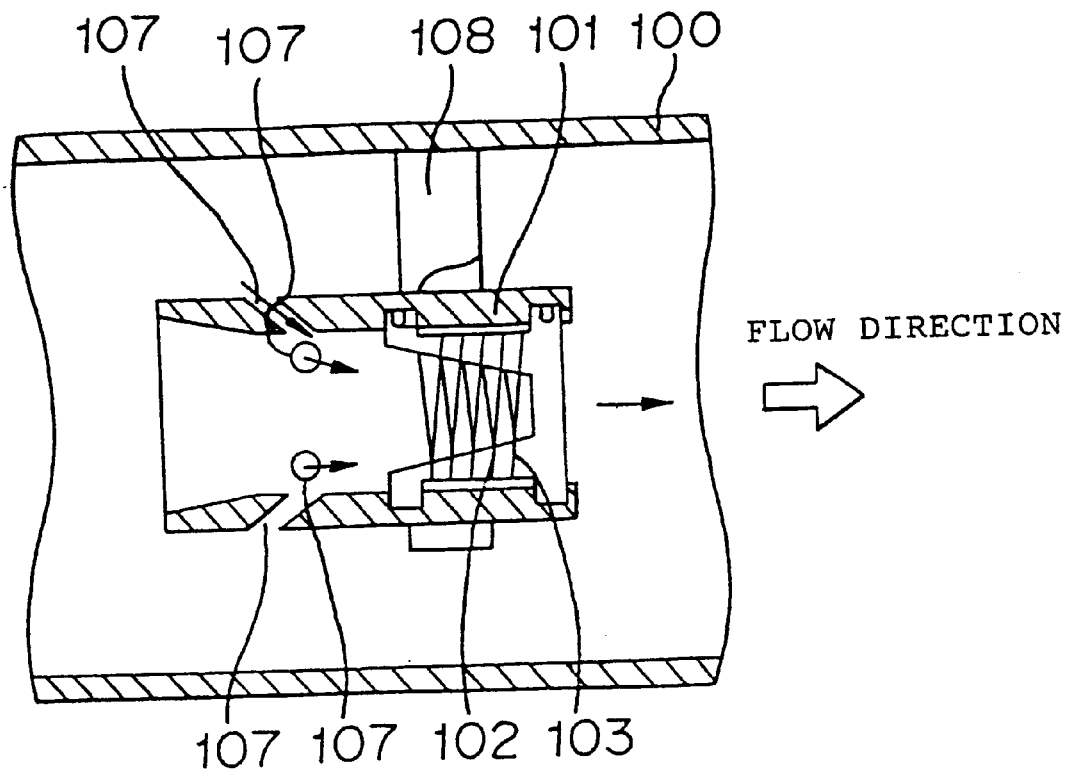
FLOW DIRECTION
FIG. 32 (b) PRIOR ART
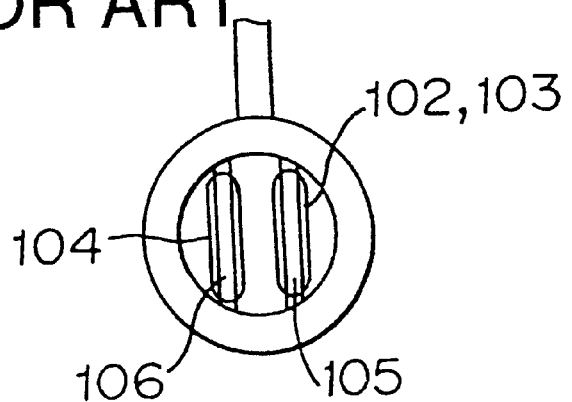

FLOW RATE MEASURING DEVICE

BACKGROUND OF THE INVENTION

1. Field of the Invention

The present invention relates to a device for measuring the flow rate of a fluid comprising a constant flow, a pulsating flow or a pulsating flow with a backward current therein, in particular, a device suited for measuring the intake air flow rate of an internal combustion engine.

2. Discussion of Background

In FIG. 31 is shown a cross-sectional view of the structure of an induction system for an automobile engine. In this Figure, reference numeral 1 designates an intake air flow rate measuring device for measuring the flow rate of intake air, reference numeral 2 designates a surge tank, reference numeral 3 designates an arrow to indicate the intake air, reference numeral 4 designates an air cleaner, reference numeral 5 designates a cleaning filter provided in the air cleaner 4, reference numeral 6 designates a throttle valve for controlling the flow rate of the intake air 3, reference numeral 7 designates an intake air passage, reference numeral 8 designates an engine combustion chamber, reference numeral 9a designates an intake manifold for introducing the intake air into the engine combustion chamber 8, reference numeral 9b designates an exhaust manifold for taking out exhaust gas after combustion, reference numeral 11 designates a flow rate measuring duct, reference numeral 12 designates a flow rate detector, reference numeral 85 designates an air inlet, reference numeral 86 designates an intake valve, and reference numeral 87 designates an exhaust valve.

The intake air 3 which has entered through the air inlet 85 is cleaned through the filter 5 in the air cleaner 4, passes through the intake air flow rate measuring device 1 and the throttle valve 6 in the intake air passage 7, the surge tank 2 and the intake manifold 9a in this order, and is introduced into the engine combustion chamber 8, being mixed with fuel. After combustion, the intake air is released to atmosphere through the exhaust manifold 9b.

It has been known that the flow fashion of the intake air 3 passing through the intake air flow rate measuring device 1 in a series of intake/exhaust strokes depends on an operation state such as engine speed and opening degree of the throttle valve 6 so that a constant stable flow with a constant flow velocity is provided in some cases and a pulsating flow with a flow velocity thereof varied with time is provided in some cases.

In the intake/exhaust strokes of an engine, the intake valve 86 starts opening in the exhaust stroke to improve trapping efficiency. In some cases, not only a forward current from an air inlet 85 toward the combustion engine 8 but also a backward current is generated in the intake pipe 7 since the exhaust gas that remains in the cylinder enters the intake valve 86 as well as the exhaust valve 87.

A conventional flow measuring device can not measure the flow rate of such a pulsating flow, in particular, a pulsating flow with a backward current therein, and the conventional device produces a considerable error in measurement of the flow rate of such a pulsating flow. Although the error has been reduced by software for correction in such a case, the measurement of the flow rate has a limited measuring accuracy, and the correction contributes to an increase in cost. From this viewpoint, it is extremely desirable that the intake air flow rate measuring device 1 basically has a function to detect a backward current, in terms of improvement in a measuring accuracy and a reduction in cost.

Now, explanation of the intake air flow rate measuring device 1 will be made. In order that the measurement of the intake air flow rate in an internal combustion engine becomes decreasingly less susceptible to drift or turbulence caused by a bent portion of the intake air passage 7 or the air cleaner 4, the flow rate measuring duct, which is a size smaller than the intake air passage, has been provided in the intake air passage so as to have a longitudinal axis thereof extended substantially parallel to the flow of a fluid to be detected, and the flow rate detector 12, such as a flow velocity sensor, has been in turn provided in the flow rate measuring duct to rectify the flow near to the detector, producing a stable output.

This arrangement has created a problem in that the flow rate detector 12 in the flow rate measuring duct 11 can not stably detect a flow rate of a fluid to be detected since the provision of the flow rate measuring duct 11 produces unstable vortexes or separation of the flow near to an inner wall of the flow rate measuring duct 11 to disturb the flow passing through the flow rate measuring duct 11. If the flow separates at an inlet of the flow rate measuring duct 11, the separation region has a thickness thereof increased toward a downstream direction. It is known that gas is irregularly disturbed by a shear force in the vicinity of the boundary between the separation region and a principal current portion since the separation region and the principal current portion have different flow velocities. The irregular disturbance has contributed to generation of an error in flow rate measurement.

In order to solve this problem, it has been proposed in JP-A-604813 that the flow rate measuring duct with the rectifying function stated above has small holes to reduce separation currents and vortexes caused at the inlet of the flow rate measuring duct so as to equalize the flow velocity distribution in the flow rate measuring duct. The details of this arrangement will be explained, referring to FIGS. 32(a) and 32(b). FIG. 32(a) is a cross-sectional side view, and FIG. 32(b) is a front view. In these Figures, reference numeral 100 designates an intake pipe, reference numeral 101 designates the flow rate measuring duct, reference numeral 102 designates an elastic heater element for measuring a flow rate, reference numeral 103 and 104 designate temperature-dependent elements, reference numeral 105 designates a first supporter, reference numeral 106 designates a second supporter, reference numeral 107 designates small holes, and reference numeral 108 designates a stay.

When the resistance wire 102 is energized and heated, and when air flows across the resistance wire in a forward direction, the temperature-dependent resistance wire 103 is cooled by the air flow supplied from an upstream direction. Since the air that has been heated by an upstream portion of the temperature-dependent resistance wire 103 passes across temperature-dependent resistance wire 104 at that time, a temperature difference due to heating of the intake air is provided between the temperature-dependent resistance wire 103 and the temperature-dependent resistance wire 104. The temperature difference varies, depending on the caloric value of the resistance wire 102 and the mass flow rate of the intake air. The static pressure on an inner wall of the flow rate measuring duct 101 becomes smaller than the static pressure outside the flow rate measuring duct since the flow velocity in the flow rate measuring duct 101 is slower than that outside the flow rate measuring duct 101 because of the presence of friction loss against the inner wall in the flow rate measuring duct 101. The difference in both static pressures creates currents which are directed into the flow rate measuring duct 101 from outside the flow rate measuring duct 101 through the small holes 107. Since the gas that has flowed into the flow rate measuring duct 101 through the small holes 107 enters the separation region to reduce the velocity difference between the principal current portion and the separation region, a velocity boundary layer comes closer to the inner wall of the flow rate measuring duct 101, decreasing the disturbance in the flow velocity. The publication states that this arrangement can transfer the heat from the heater 102 to the temperature-dependent element 104 in stable fashion to improve the flow rate measuring accuracy.

However, this proposal does not take into account a problem in that, when the flow rate measuring duct 101 is provided with a pulsating flow with a flow velocity thereof varied with time, the flow velocity in the flow rate measuring duct 101 is lowered under the influence of vortexes caused in a rear flow behind the flow rate measuring duct, producing an error in flow rate detection.

An object in a pulsating flow has totally different flow fashion from an object in a constant flow. An object in an accelerating flow has quite different flow fashion from an object in a decelerating flow. In particular, when the conventional flow rate measuring duct 11 is provided in a pulsating flow, a significant error in flow rate detection is produced in deceleration, which will be explained.

Before explaining the problem that is caused by the provision of the flow rate measuring duct 11 in a pulsating flow, an explanation of a case in which a flat plate is provided in a constant flow or a pulsating flow so as to extend along the flow will be made.

In FIG. 33 is shown shear currents that merge through a flat plate 21 put in a constant flow so as to extend in parallel with the flow, wherein an unstable shear layer is produced at the boundary surface between the shear currents, two-dimensional cyclic vortexes 98 are produced, the cyclic vortexes change into discrete vortexes 55 and the discrete vortexes eventually collapse. It is known that the currents mix together in a region having a certain expansion angle 99. As shown in FIG. 34, the mean flow velocity distribution in that time becomes flatter in the mixing region as the flows move downstream. As a result, the shear is gradually eased.

In the case of an accelerating pulsating flow, the expansion angle 99 of the mixing region becomes smaller than that in the case of a constant flow because of addition of a potential flow to the flow just prior to acceleration as shown in FIG. 35.

In the case of a decelerating pulsating flow, the expansion angle 99 of the mixing region becomes larger and the discrete vortexes 55 become more massive than those in a constant flow as shown in FIG. 36.

Since the flow rate measuring duct 11 is provided by forming the flat plate 21 into a cylindrical shape, the flow fashion in the rear flow behind the flat plate 21 expands in a circumferential direction of the flow rate measuring duct 11 with respect to a longitudinal axis 18 thereof. In the case of a constant flow, annular-shaped vortexes 90 are produced from a downstream end of the flow rate measuring duct 11 because of the presence of shear force caused by a velocity difference between air currents 23 and 24 in and outside the flow rate measuring duct 11 as shown in FIG. 37. The annular-shaped vortexes 90 diffuse, being changed into the discrete vortexes 55 by the mixing region having a certain expansion angle 99. In this Figure, reference numeral 52 designates a distance required for the vortexes to collapse. A shorter distance indicates faster development in collapse.

In the case of an accelerating pulsating flow, the current 23 in the flow rate measuring duct 11 is almost the same as the current 24 outside the flow rate measuring duct 11 as shown in FIG. 38 since the mixing region is constricted.

In the case of a decelerating pulsating flow, the flow velocity in the flow rate measuring duct 11 is significantly lowered in comparison with the case of a constant flow as shown in FIG. 39 since the discrete vortexes 55 become massive and occupy a wide portion near to the outlet of the flow rate measuring duct 11 so as to prevent the current 23 from going out from the flow rate measuring duct. As a result, the flow rate of the current 24 outside the flow rate measuring duct 11 is increased by a decrease in the flow rate of the current 23 in the flow rate measuring duct 11, changing a separation ratio of both currents in and outside the flow rate measuring duct 11. The separation ratio means a ratio of the flow rate in and outside the flow rate measuring duct 11. If the flow rate measuring device 1 is set so that the relationship between a total flow rate and an output from the flow rate detector 12 are checked with respect to a constant flow, and if the flow changes from a constant flow into a pulsating flow, the flow velocity in the flow rate measuring duct 11 is significantly lowered and prevents the flow rate detector 12 from correctly detecting a flow rate, causing a problem in that the flow rate measuring device 1 produces an error in flow rate detection.

If a backward current is produced, the discrete vortexes 55 which have become massive during deceleration are carried on the backward current to move upstream, being separated into portions in and outside the flow rate measuring duct 11 as shown in FIG. 40. The vortexes that have come into the flow rate measuring duct 11 collide against the flow rate detector 12 to disturb the current near to the flow rate detector. This creates a problem in that an error in flow rate detection is produced since the flow rate detector 12 detects a variation in the flow velocity disturbed by the discrete vortexes 55 irrespective of the principal current.

Although the provision of the small holes in an upstream portion of the flow rate measuring duct 101 shown in FIG. 32 provides a rectifying effect in the flow rate measuring duct 101 to some degree in the case of a constant flow, this arrangement does not at all take into account the problem in that, in the case of a pulsating flow, the separation ratio of the currents in and outside the flow rate measuring duct 101 is varied under the influence of the vortexes generated in the rear flow to produce an error in flow rate detection.

SUMMARY OF THE INVENTION

It is an object of the present invention to solve these problems stated above, and to provide a flow rate measuring device capable of not only offering a rectifying effect by a flow rate measuring duct but also reducing a variation in a separation ratio between currents in and outside the flow rate measuring duct to reduce an error in flow rate detection in a constant flow, a pulsating flow and a pulsating flow with a backward current contained therein.

The flow rate measuring device according to a first aspect of the present invention comprises a flow rate measuring duct to be provided in a primary passage for a fluid so as to extend in substantially parallel with the primary passage; and a flow rate detector provided in the flow rate measuring duct to measure a flow rate of the fluid in the primary passage, wherein the flow rate measuring duct has a downstream wall thereof formed with at least one of a notch, a through hole and an air-permeable member.

In the flow rate measuring device according to a second aspect of the present invention, a plurality of notches or through holes are provided in a circumferential direction of the flow rate measuring duct with respect to a longitudinal axis thereof in the arrangement according to the first aspect.

In the flow rate measuring device according to a third aspect of the present invention, the notches or through holes are provided at equal distances in the circumferential direction in the arrangement according to the second aspect.

In the flow rate measuring device according to a fourth aspect of the present invention, the notches or through holes are provided at an odd number of locations in the circumferential direction in the arrangement according to the third aspect.

In the flow rate measuring device according to a fifth aspect of the present invention, the notch has a gradually expanded toward a downstream direction in the arrangement according to the first aspect.

In the flow rate measuring device according to a sixth aspect of the present invention, the flow rate measuring duct has a wall thickness of a portion thereof with the notch or the through holes formed therein decreased toward the downstream direction in the arrangement according to the first aspect.

In the flow rate measuring device according to a seventh aspect of the present invention, the flow rate measuring duct has an outer diameter of a portion thereof with the notch or the through hole formed therein decreased toward the downstream direction in the arrangement according to the sixth aspect.

In the flow rate measuring device according to an eighth aspect of the present invention, the flow rate measuring duct has an inner diameter of a portion thereof the notch or through hole formed therein increased toward the downstream direction in the arrangement according to the seventh aspect.

In the flow rate measuring device according to a ninth aspect of the present invention, the arrangement according to the first aspect further comprises a projection on an outer wall of the flow rate measuring duct upstream the notch, through hole or air-permeable member, the projection extending in the circumferential direction with respect to a longitudinal direction of the flow rate measuring duct.

In the flow rate measuring device according to a tenth aspect of the present invention, the air-permeable member has an air-permeable resistance decreased toward a downstream direction in the arrangement according to the first aspect.

In the flow rate measuring device according to the first aspect, annular-shaped vortexes that are generated from a rear flow behind the flow rate measuring duct can be forcibly separated into sections. The separated vortexes collapse promptly as smaller and discrete vortexes. This arrangement can not only offer a rectifying effect by the flow rate measuring duct but also reduce a variation in a separation ratio between currents in and outside the flow rate measuring duct in a constant flow and a pulsating flow. Even if the discrete vortexes move upstream by occurrence of a backward current, this arrangement can minimize the magnitude of the discrete vortexes. Thus, the flow rate measuring device can not only offer the rectifying effect by the flow rate measuring duct but also reduce an error in flow rate detection in a constant flow, a pulsating flow and a pulsating flow with a backward current contained therein.

In the flow rate measuring device according to the second aspect, the annular-shaped vortexes that are generated from the rear flow behind the flow rate measuring duct can be forcibly, reliably and rapidly separated into sections. The separated vortexes collapse promptly as smaller and discrete vortexes. This arrangement can not only offer the rectifying effect by the flow rate measuring duct but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes. Thus, the flow rate measuring device can not only offer the rectifying effect by the flow rate measuring duct but also reduce an error in flow rate detection in a constant flow, a pulsating flow and a pulsating flow with a backward current contained therein.

In the flow rate measuring device according to the third aspect, the annular-shaped vortexes that are generated from the rear flow behind the flow rate measuring duct can be separated in sections at equal distances with respect to a longitudinal axis of the flow rate measuring duct so as to minimize the magnitude of the separated annular-shaped vortexes. The separated vortexes collapse promptly as smaller and discrete vortexes. This arrangement can not only offer the rectifying effect by the flow rate measuring duct but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes. Thus, the flow rate measuring device can not only offer the rectifying effect by the flow rate measuring duct but also reduce an error in flow rate detection in a constant flow, a pulsating flow and a pulsating flow with a backward current contained therein.

In the flow rate measuring device according to the fourth aspect, the annular-shaped vortexes that are generated from the rear flow behind the flow rate measuring duct are made unstable by upsetting their symmetry. The vortexes collapse promptly as smaller and discrete vortexes. This arrangement can not only offer the rectifying effect by the flow rate measuring duct but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes. Thus, the flow rate measuring device can not only offer the rectifying effect by the flow rate measuring duct but also reduce an error in flow rate detection in a constant flow, a pulsating flow and a pulsating flow with a backward current contained therein.

In the flow rate measuring device according to the fifth aspect, the annular-shaped vortexes that are generated from the rear flow behind the flow rate measuring duct can be reliably separated into sections since the separation is made smoothly in a flow direction. The separated vortexes collapse promptly as smaller and discrete vortexes. This arrangement can not only offer the rectifying effect by the flow rate measuring duct but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes. Thus, the flow rate measuring device can not only offer the rectifying effect by the flow rate measuring duct but also reduce an error in flow rate detection in a constant flow, a pulsating flow and a pulsating flow with a backward current contained therein.

In the flow rate measuring device according to the sixth aspect, the current that has passed outside the flow rate measuring duct and the current that has passed though the flow rate measuring duct merge smoothly and mix vigorously together in the rear flow behind the flow rate measuring duct. The annular-shaped vortexes can be promptly collapsed as further smaller discrete vortexes. This arrangement can not only offer the rectifying effect by the flow rate measuring duct but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes. Thus, the flow rate measuring device can not only offer the rectifying effect by the flow rate measuring duct but also reduce an error in flow rate detection in a constant flow, a pulsating flow and a pulsating flow with a backward current contained therein.

In the flow rate measuring device according to the seventh aspect, the current that has passed outside the flow rate measuring duct and the current that has passed through the flow rate measuring duct merge smoothly. The annular-shaped vortexes that are generated from the rear flow behind the flow rate measuring duct can be sucked out from inside toward outside by the merged currents. The occupied area of the separated discrete vortexes in the vicinity of an outlet of the flow rate measuring duct is reduced since the separated discrete vortexes move outside the flow rate measuring duct. This arrangement can not only offer the rectifying effect by the flow rate measuring duct but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes. Thus, the flow rate measuring device can not only offer the rectifying effect by the flow rate measuring duct but also reduce an error in flow rate detection in a constant flow, a pulsating flow and a pulsating flow with a backward current contained therein.

In the flow rate measuring device according to the eighth aspect, this arrangement can not only offer the rectifying effect by the flow rate measuring duct but also reduce a variation in the separation ratio between the currents in and outside the flow rate measuring duct in a constant flow and a pulsating flow. Even if a backward current is generated, this arrangement can reduce an error in flow rate detection by a contraction effect.

In the flow rate measuring device according to the ninth aspect, a separation region is created in a rear flow behind the projection to suck out the current from inside toward outside. The discrete vortexes move downstream, being deflected in the circumferential direction. As a result, the current that has passed through the flow rate measuring duct is hardly susceptible to a decrease in flow velocity thereof. This arrangement can not only offer the rectifying effect by the flow rate measuring duct but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes and cause the discrete vortexes to pass outside the flow rate measuring duct. Thus, the flow rate measuring device can not only offer the rectifying effect by the flow rate measuring duct but also reduce an error in flow rate detection in a constant flow, a pulsating flow and a pulsating flow with a backward current contained therein.

In the flow rate measuring device according to the tenth aspect, the annular-shaped vortexes that are generated from the rear flow behind the flow rate measuring duct can be reliably separated into sections since the separation is made smoothly in a flow direction. The separated vortexes collapse promptly as smaller and discrete vortexes. This arrangement can not only offer the rectifying effect by the flow rate measuring duct but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes. Thus, the flow rate measuring device can not only offer the rectifying effect by the flow rate measuring duct but also reduce an error in flow rate detection in a constant flow, a pulsating flow and a pulsating flow with a backward current contained therein.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a schematic view to explain flow fashion in occurrence of a backward current in the first embodiment;

FIG. 8 is an enlarged cross-sectional view to show an essential portion of the flow rate measuring duct according to the first embodiment and to explain flow fashion offered by the duct;

FIGS. 32(a) and 32(b) are a cross-sectional side view and a front view of a conventional flow rate measuring device, respectively;

DESCRIPTION OF THE PREFERRED EMBODIMENTS

Embodiment 1

Figure 1:
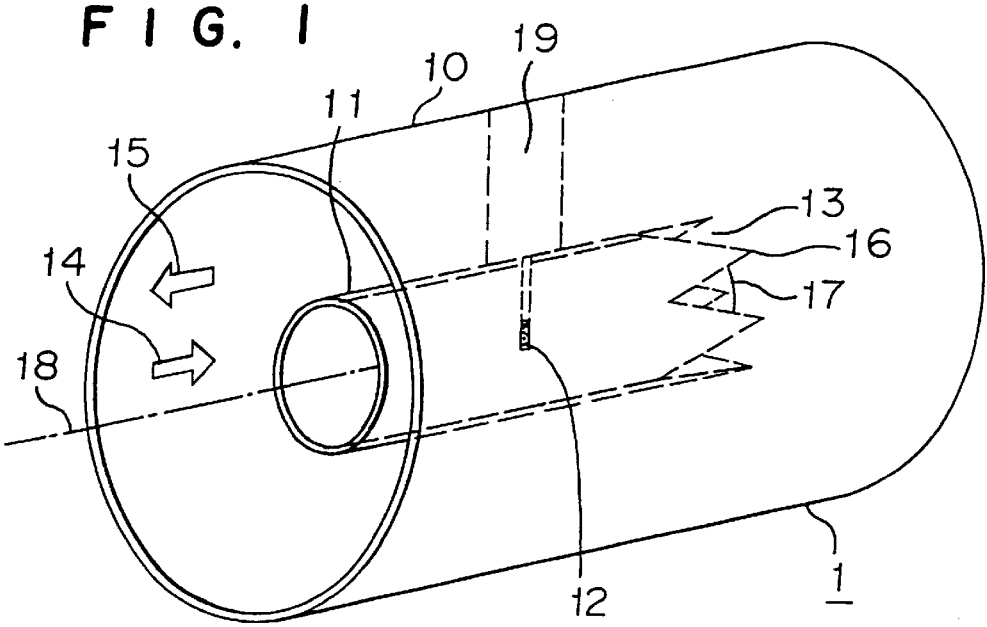
FIG. 1 is a perspective view of a flow rate measuring device according to a first embodiment of the present invention.
Figure 2:
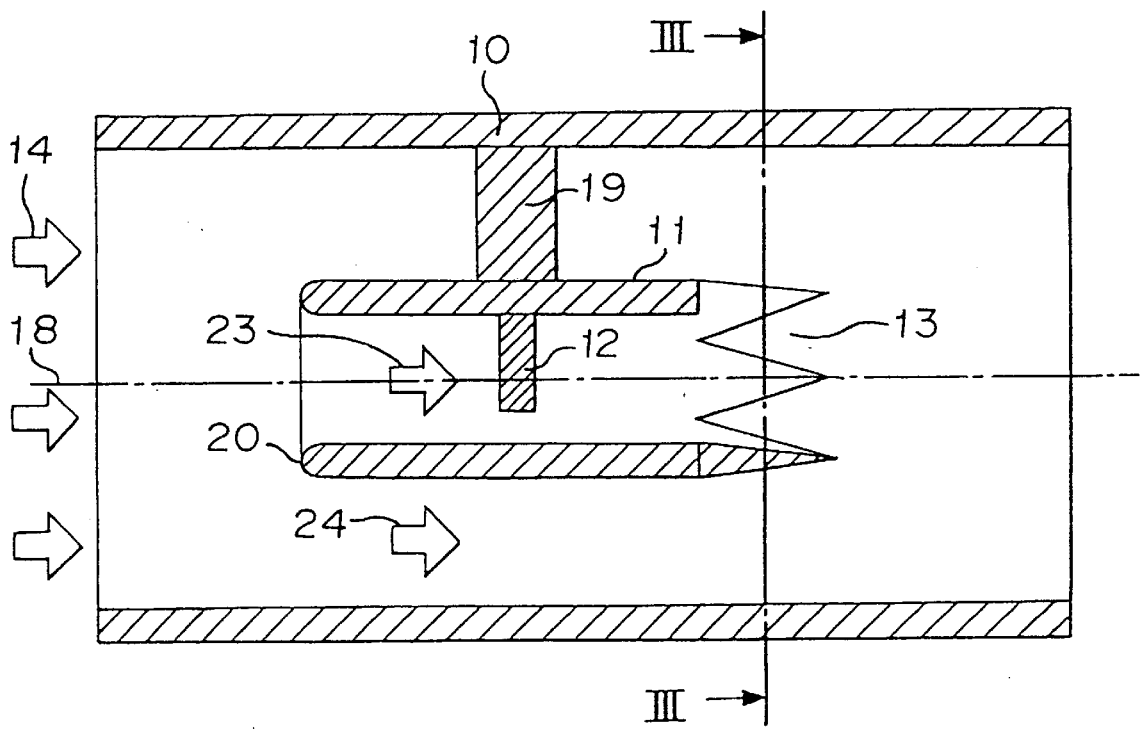
FIG. 2 is a cross-sectional view of the device of FIG. 1, taken along a plane containing a longitudinal axis of the device.
Figure 3:
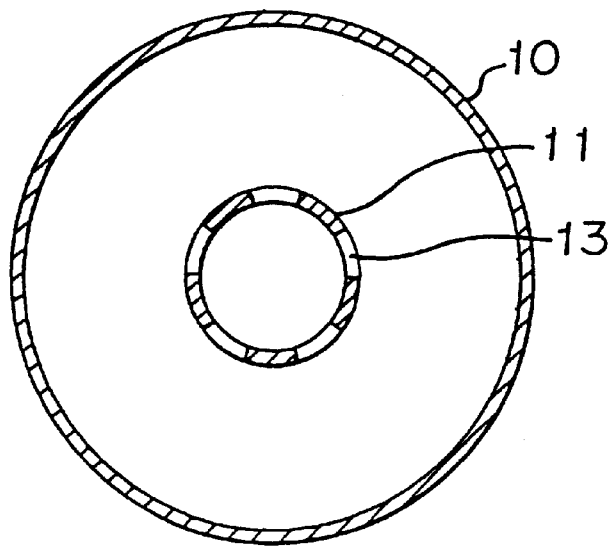
FIG. 3 is a cross-sectional view of the device of FIG. 2, taken along the line III—III.

In FIG. 1 is shown a perspective view of the flow rate measuring device according to a first embodiment of the present invention. The flow rate measuring device may be provided at the same position as the conventional measuring device in the induction system for an automobile engine shown in FIG. 31 to measure an intake air flow rate. In FIG. 2 is shown a cross-sectional side view of the measuring device of FIG. 1, taken along a plane containing a longitudinal axis 18 of the duct. In FIG. 3 is shown a cross-sectional view of the measuring device of FIG. 2, taken along the line III—III.

Figure 31:
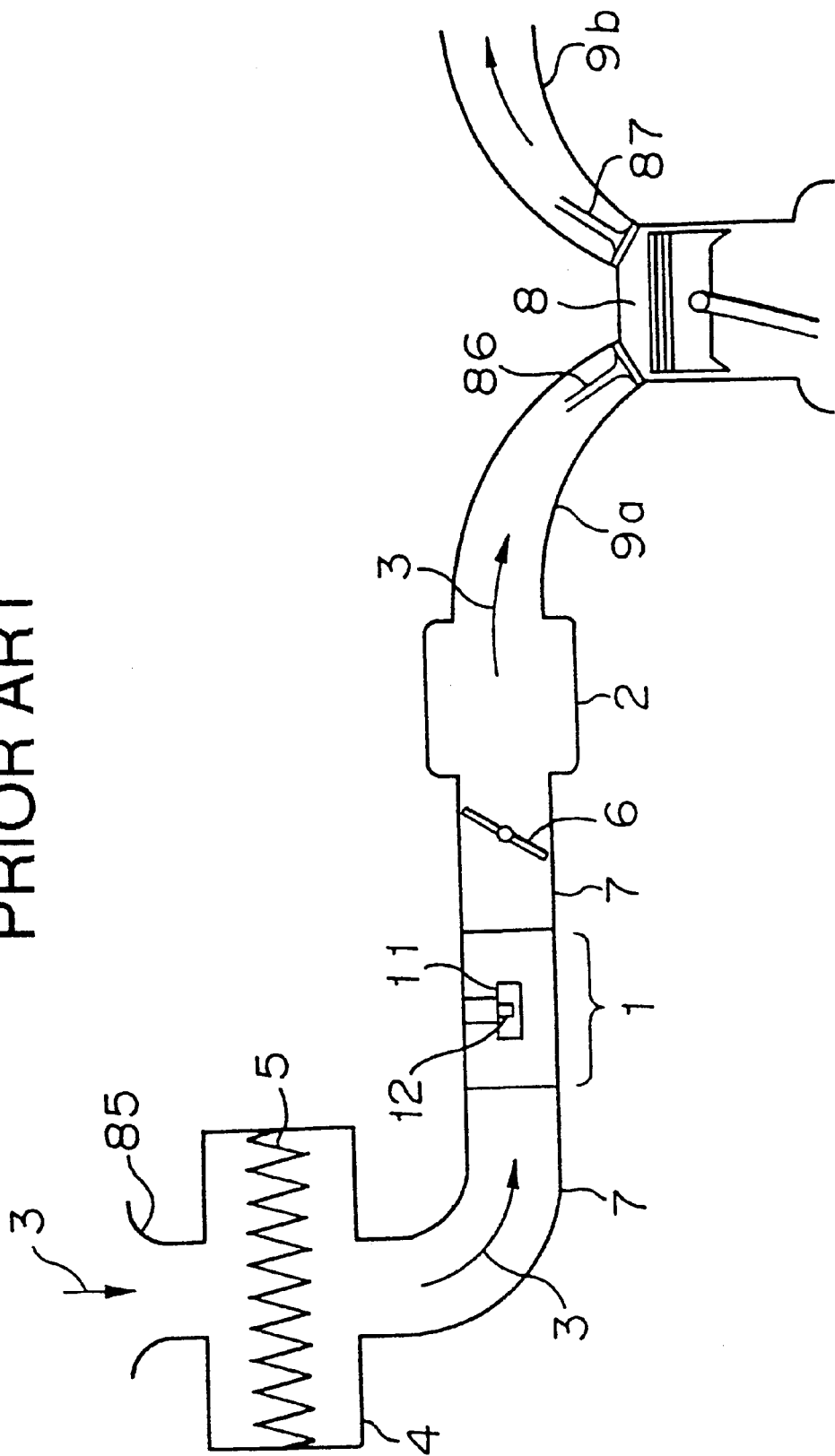
FIG. 31 is a cross-sectional side view of a typical intake air system for an automobile engine.
Figure 33:
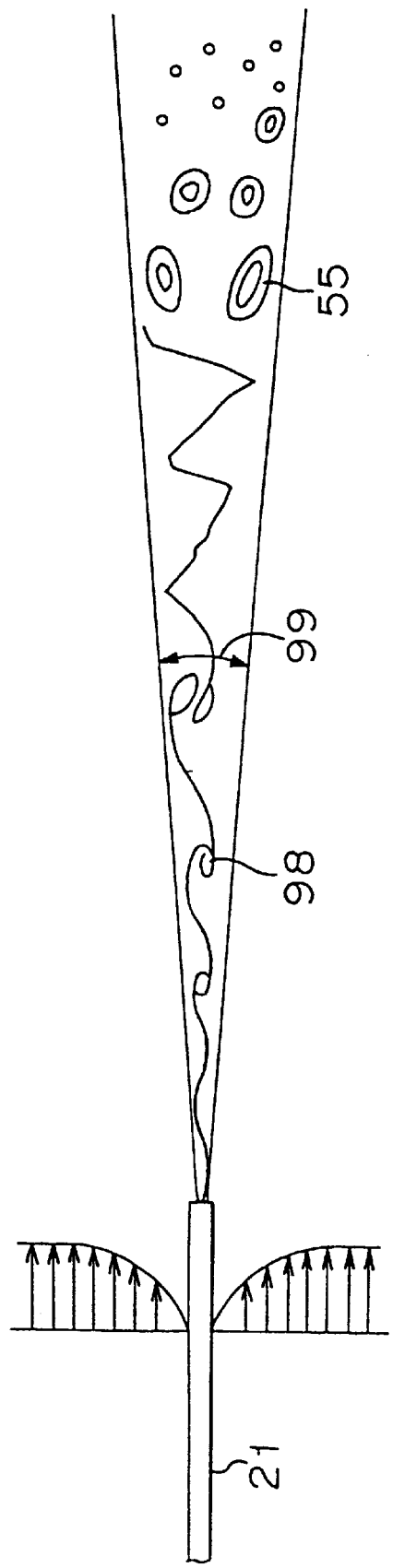
FIG. 33 is a schematic view to explain shear currents that merge at a flat plate provided in a constant flow, the plate extending in parallel with the flow.
Figure 34:
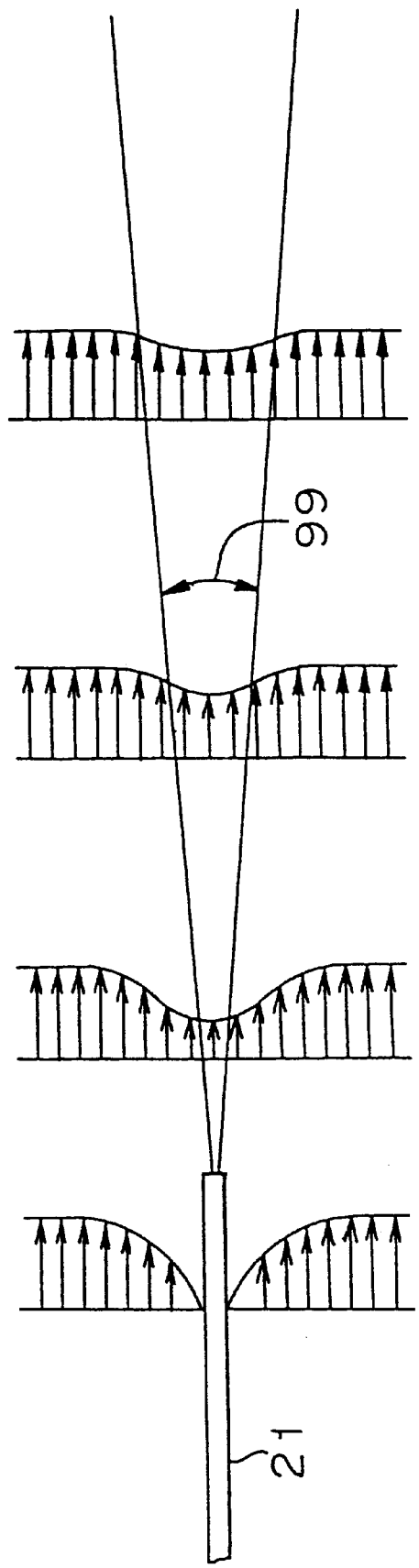
FIG. 34 is a schematic view of flow velocity distributions of the shear currents that merge at the flat plate.
Figure 35:
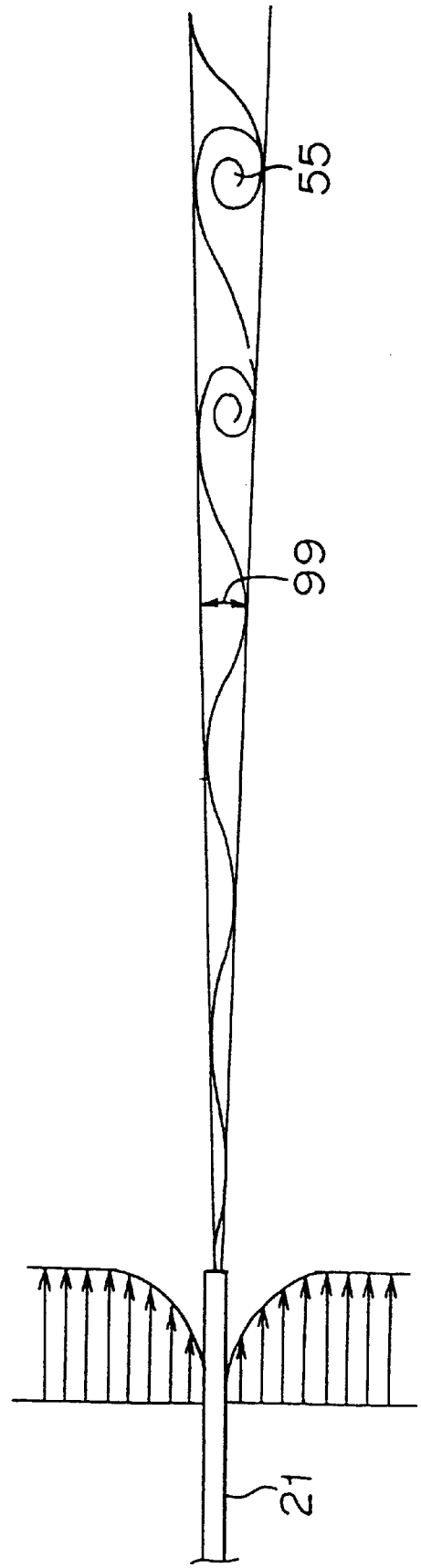
FIG. 35 is a schematic view to explain the shear currents that merge at the flat plate in occurrence of acceleration.
Figure 36:
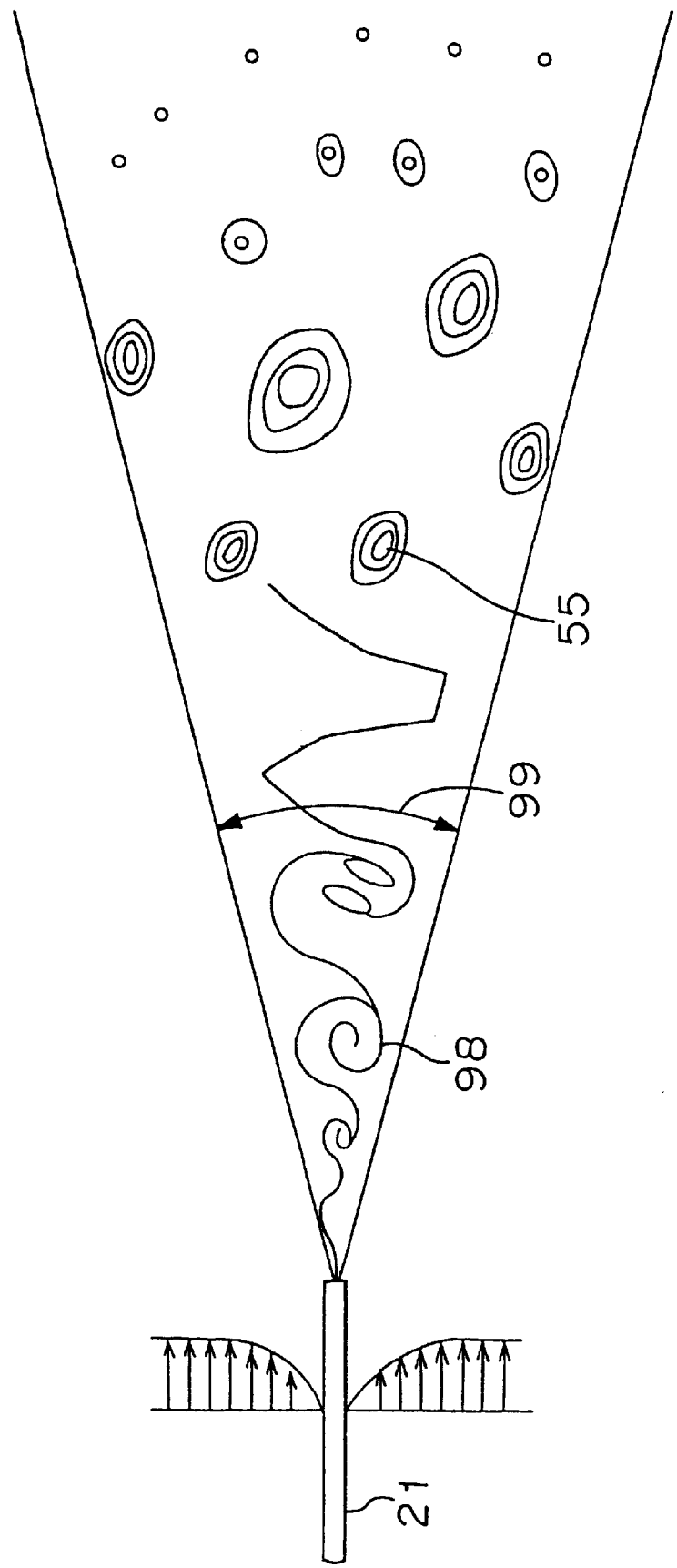
FIG. 36 is a schematic view to explain the shear currents that merge at the flat plate in occurrence of deceleration.

In these figures, reference numeral 10 designates a cylindrical housing which has an inner wall surface merged smoothly with an inner wall surface of the intake air passage 7 shown in FIG. 31 and which serves as a principal current passage for a fluid. Reference numeral 11 designates a cylindrical flow rate measuring duct which is provided in the principal current passage 10 so as to have a longitudinal axis thereof extending in parallel with a longitudinal axis of the principal current passage 10. The flow rate measuring duct 11 may have a longer or shorter length than the principal current passage 10. Reference numeral 12 designates a flow rate detector which is provided in the flow rate measuring duct 11. The flow rate detector has a detection unit substantially provided on the longitudinal axis of the flow rate measuring duct 11 in this embodiment. Reference numeral 18 designates the longitudinal axis of the flow rate measuring duct 11. Reference numeral 19 designates a stay which connects the flow rate measuring duct 11 to the principal current passage 10, and which houses wiring for the flow rate detector 12 and supports the flow rate measuring duct 11. Reference numeral 20 designates a rounded end which is formed on the flow rate measuring duct 11 to minimize the generation of a separation current at the inlet end of the flow rate measuring duct. Reference numeral 14 designates an arrow which indicates a normal flow direction or a forward current direction of intake air in the principal current passage 10 or the flow rate measuring duct 11. Reference numeral 15 designates an arrow which indicates a backward current direction. Reference numeral 13 designates one of notches. The notches are provided at five locations at a downstream end of the flow rate measuring duct 11 in the forward current direction 14. The notches, which are geometrically congruent each other, are provided at equal distances in a circumferential direction of the duct.

The respective notches have a triangle shape with an opening width thereof expanded by cutting out respective portions of the downstream end of the flow rate measuring duct 11. Reference numeral 16 designates a knife edge which is provided on the downstream of the flow rate measuring duct 11 by gradually decreasing the thickness of the portion with each of the notches 13 formed therein toward a downstream direction. Reference numeral 17 designates an expansion angle of a notch 13. Reference numeral 18 designates the longitudinal axis of the flow rate measuring duct 11. Reference numeral 23 designates an arrow which indicates a current in the flow rate measuring duct 11. Reference numeral 24 designates an arrow which indicates a current between an outer wall of the flow rate measuring duct 11 and the inner wall of the principal current passage 10.

Although the principal current passage 10 and the flow rate measuring duct 11 are in alignment with each other in terms of their longitudinal axes in this embodiment, both axes are not always required to be in alignment with each other. The alignment of both axes is preferable in term of improvement in flow rate measuring accuracy.

Figure 4:
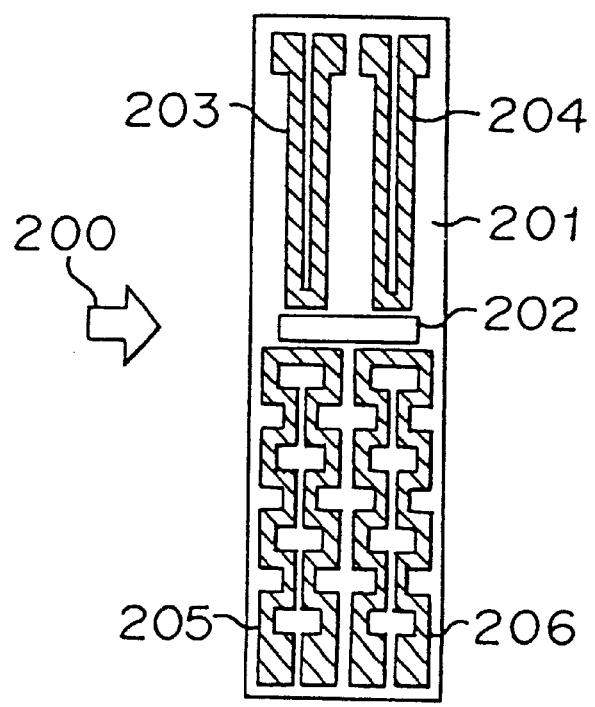
FIG. 4 is a front view of the flow rate detector applicable to the first embodiment.

Now, the structure and the operation of an example of the flow rate detector 12 will be explained. In FIG. 4 is shown a plan view of the flow rate detector applicable to the first embodiment of the present invention. This flow rate detector is an air flow sensor for an internal combustion engine, which has been disclosed in JP-A-1185416 for instance. The air flow sensor comprises a planar substrate provided in the intake air passage in parallel with the flow of the intake air, heating resistors made of heat-sensitive resistor film and provided on the planar substrate at upstream and downstream ends thereof in the flow direction of the intake air, and a comparator for determining a difference between heat dissipation quantity from each of the upstream and downstream resistors and for detecting the flow direction of the intake air.

In this figure, reference numeral 200 designates an arrow which indicates the normal air flow or the forward current direction of the air. Reference numeral 201 designates the substrate which has a small thickness and is made of plastic foil. Reference numeral 202 designates a heat insulating hole which serves to avoid thermal interference influence between the heating resistors 203, 204 and heating resistors 205, 206 for temperature compensation. Reference numeral 203 designates the heating resistor provided on the upstream side of the intake air. Reference numeral 204 designates the heating resistor provided on the downstream side of the intake air. Reference numeral 205 designates the heating resistor for temperature compensation provided on the upstream side of the intake air. Reference numeral 206 designates the heating resistor for temperature compensation provided on the downstream side of the intake air. The heating resistors for temperature compensation 205, 206 detect a temperature of the intake air and correct flow rate.

By such arrangement, flowing of the air creates a difference in heat dissipation between the upstream heating resistor 203 and the downstream heating resistor 204, and the flow direction and the flow velocity of the air can be detected based on the difference.

Now, the basic flow in the flow rate measuring device 1 will be explained. In the explanation, a flow to be detected is a constant flow which flows in the forward current direction 14.

The intake air 3 comes into the principal current passage 10 from the intake air passage 7. A part of the intake air flows through the cylindrical flow rate measuring duct 11 as indicated by the arrow 23. The remaining part flows through a dual cylindrical passage constituted by the inner wall of the principal current passage 10 and the outer wall of the flow rate measuring duct 11 as indicated by the arrow 24, being separated from the current through the flow rate measuring duct 11. The flow rate measuring duct 11 has an upstream end formed with the rounded end 20 in order to minimize the generation of the separation current from the upstream end of the flow rate measuring duct 11 into or outside the flow rate measuring duct 11.

The current 23 which has come into the flow rate measuring duct 11 from the upstream end of the flow rate measuring duct 11 has a variation in a flow velocity in a direction perpendicular to the wall of the flow rate measuring duct 11 damped because of the presence of the inner wall of the flow rate measuring duct 11, being rectified into a direction in parallel with the longitudinal axis 18. This means that the flow rate detector 12 can measure a flow which is stable and less disturbed in comparison with a case without the flow rate measuring duct 11.

The current 23 collides against the flow rate detector 12 provided in the flow rate measuring duct 11. The flow rate detector 12 may be constructed as shown in FIG. 4. The flow rate detector includes the heating resistors which are provided on the upstream side and the downstream side in the flow direction of the air and which are controlled to have a certain temperature. The heat on the upstream side is carried on the air to reach the heater on the downstream side, creating a difference in heat dissipation quantity between the upstream and downstream heating resistors. The flow rate detector can estimate the heat dissipation of the heating resistors based on a supplied electric current to the heating resistors to detect a flow velocity. In occurrence of a backward current, the heat from the downstream side heater is carried on the air to reach the upstream heater, creating a difference in heat dissipation quantity between the upstream and downstream heating resistors in a similar way. The flow rate detector 12 is a heat-sensitive sensor which can detect the direction and the flow velocity of a flow based on a difference in heat dissipation quantity.

The flow rate detector 12 which can detect a backward current detects a flow velocity in the vicinity of the longitudinal axis 18 of the flow rate measuring duct 11 moment by moment. Although most of the current 23 which has passed on the flow rate detector 12 flows out of the downstream end of the flow rate measuring duct 11, a part of the current 23 contacts and merges with the current 24 outside the flow rate measuring duct 11 through the notches 13. The merged currents come from the downstream end of the principal current passage 10 into the intake air passage 7 following the flow rate measuring duct as shown in FIG. 31.

In general, the flow rate measuring device 1 is set so that a total flow rate of intake air into the flow rate measuring device 1 and an output from the flow rate detector 12 in the flow rate measuring duct 11 are prechecked with respect to a constant flow and that the flow rate measuring device grasps the relationship between each total flow rate and each output as a function. If a flow changes into a pulsating flow, a total flow rate of intake air into the flow rate measuring device is estimated based on an output from the flow rate detector 12. In other words, it is preferable that a total flow rate of intake air into the flow rate measuring device 1 and an output from the flow rate detector 12 in the flow rate measuring duct 11 always are governed by substantially the same function at all time, or that a total flow rate of intake air into the flow rate measuring device 1 is separated into currents into and outside the flow rate measuring duct 11 at a substantially constant ratio at all time with respect to both of a constant flow and a pulsating flow.

Figure 5:
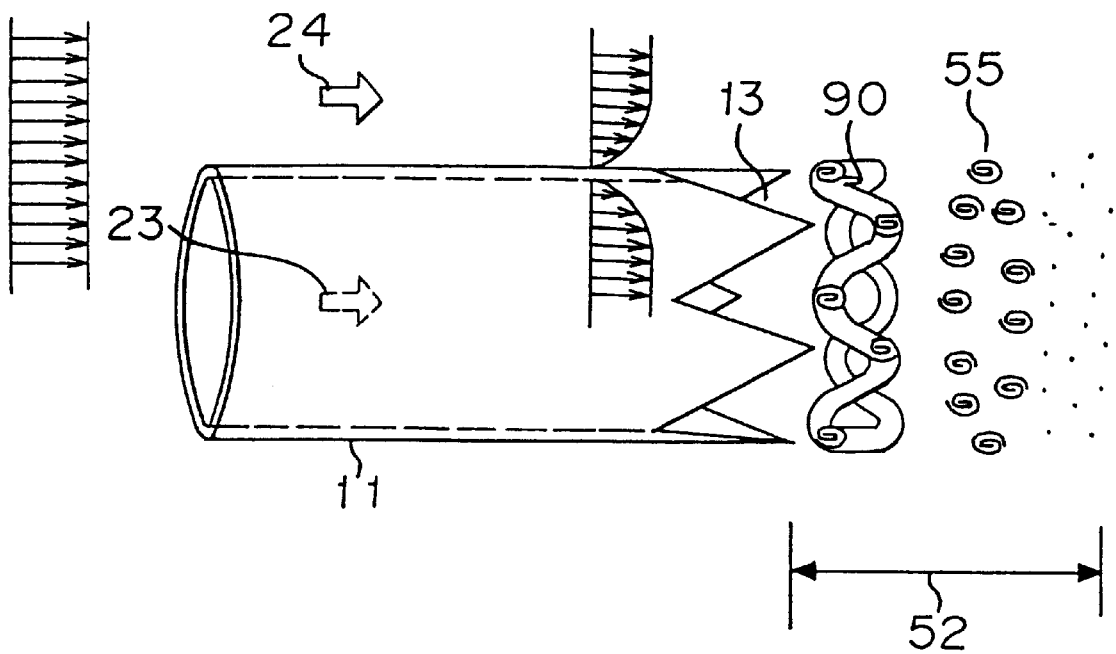
FIG. 5 is a schematic view to explain flow fashion of a constant flow in the first embodiment.
Figure 6:
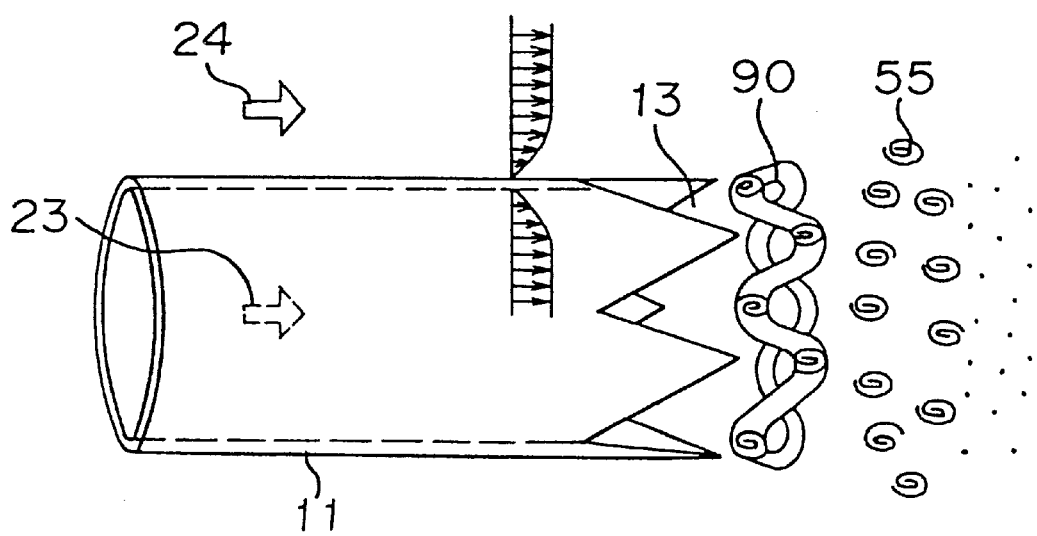
FIG. 6 is a schematic view to explain flow fashion in occurrence of deceleration in the first embodiment.
Figure 37:
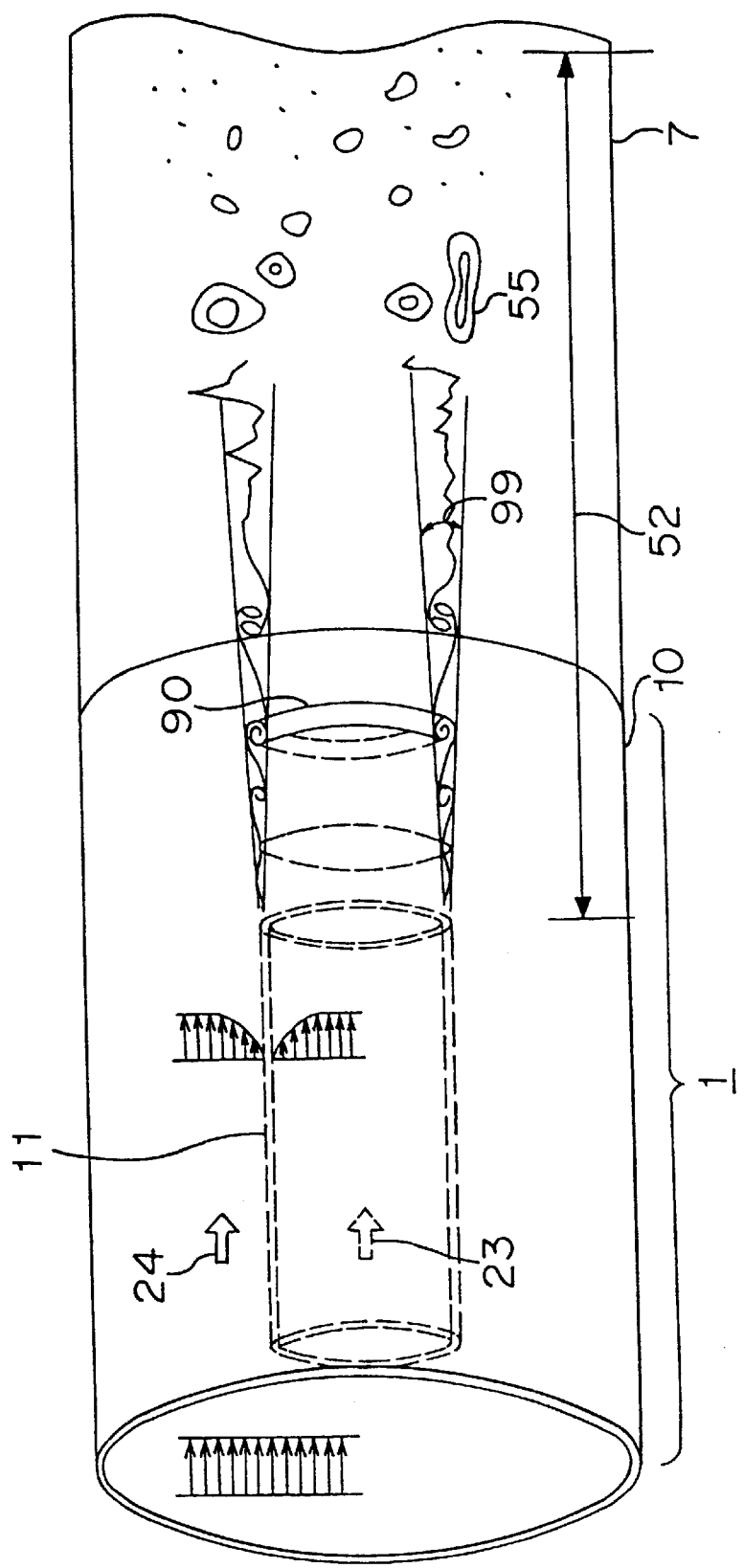
FIG. 37 is a schematic view to explain a rear flow behind a cylindrical flow rate measuring duct in a constant flow.
Figure 38:
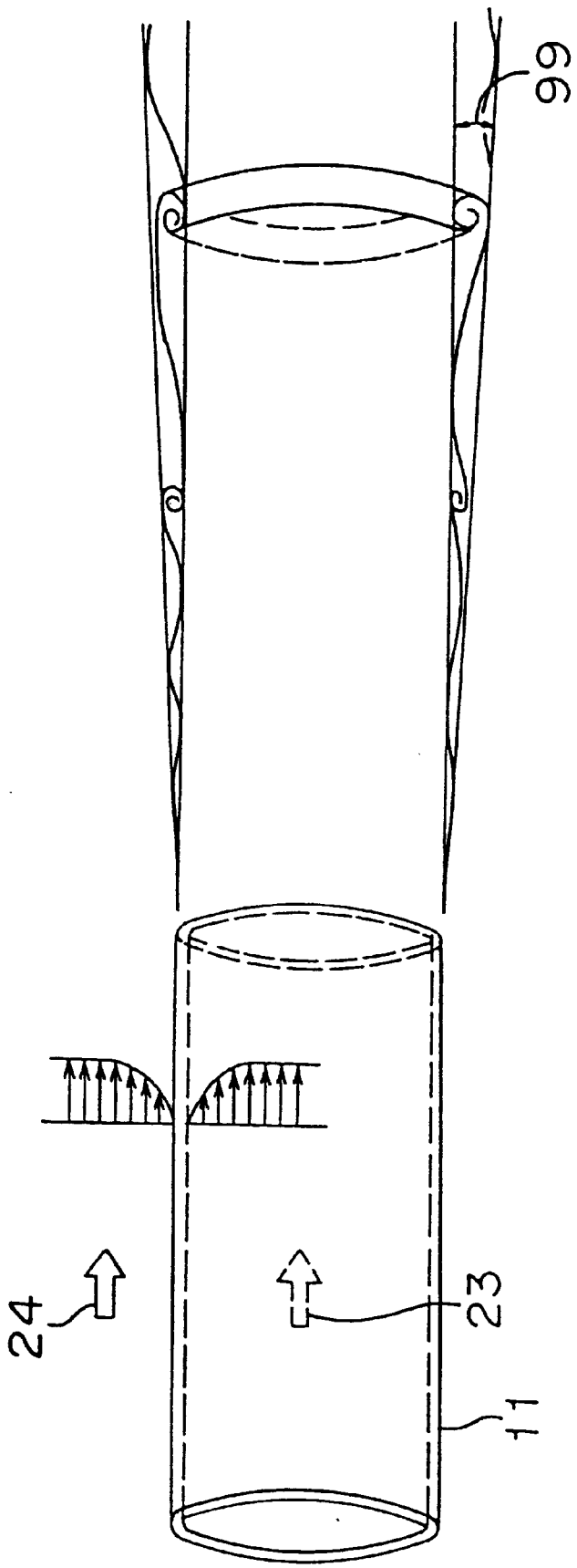
FIG. 38 is a schematic view to explain the rear flow behind the cylindrical flow rate measuring duct in occurrence of acceleration.
Figure 39:
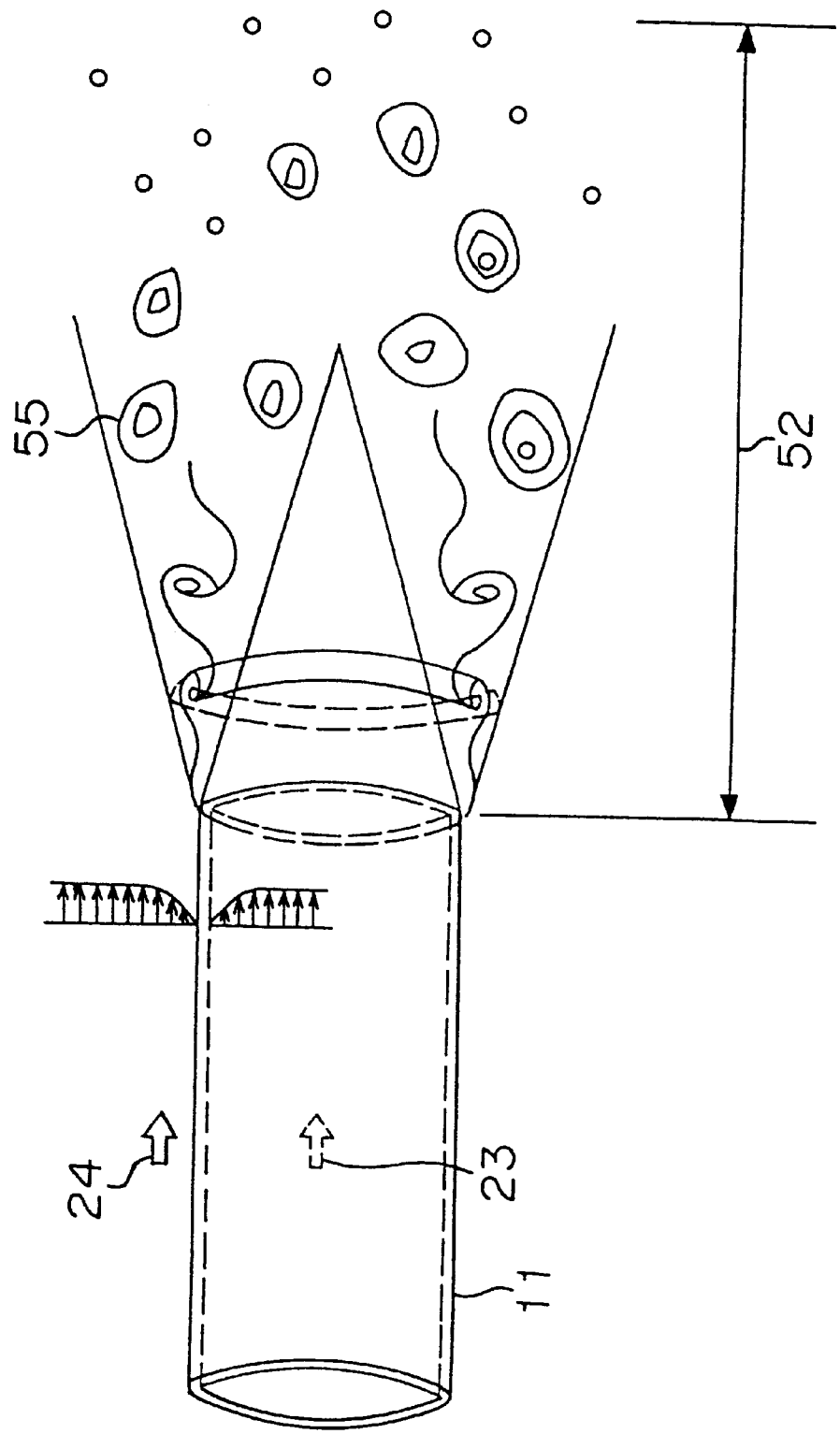
FIG. 39 is a schematic view to explain the rear flow behind the cylindrical flow rate measuring duct in occurrence of deceleration.
Figure 40:
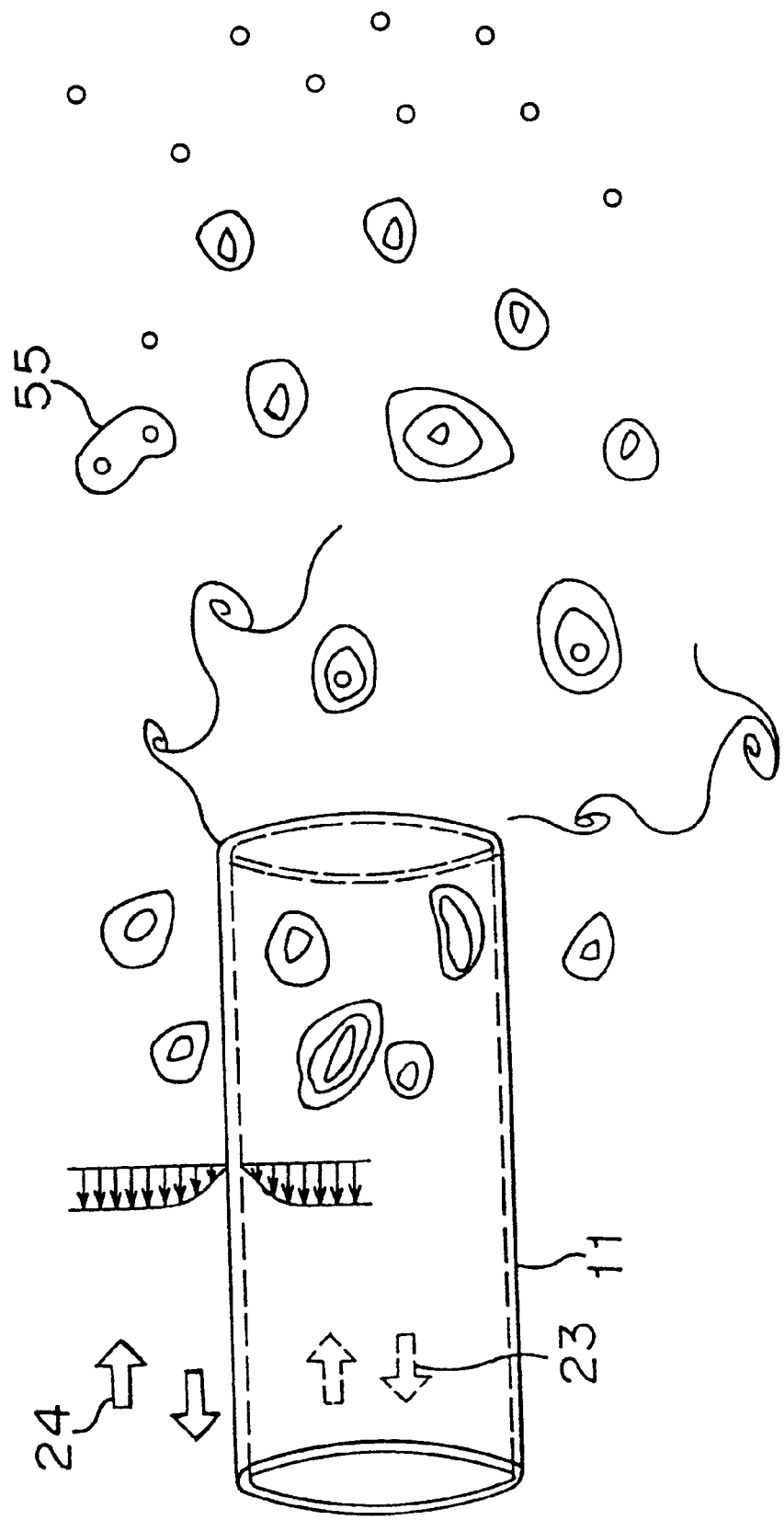
FIG. 40 is a schematic view to explain the rear flow behind the cylindrical flow rate measuring duct in occurrence of a backward current.

In order to explain an advantage provided by the notches 13 formed in the downstream end of the flow rate measuring duct 11, a case wherein no notches 13 are formed in the downstream end of the flow rate measuring duct 11 and a case wherein the notches 13 are formed in the downstream end of the flow rate measuring duct 11 are compared in terms of a difference in flow fashion. As stated earlier, FIG. 37 shows what movement is caused in a constant flow when the flow rate measuring duct 11 has no notches 13 formed therein. FIGS. 38, 39 and 40 show flow fashion in the flow rate measuring duct 11 in each of acceleration, deceleration and occurrence of a backward current, respectively. FIG. 5 shows what movement is caused in a constant flow when the flow rate measuring duct 11 has the notches 13 formed therein. FIGS. 6 and 7 show the flow fashion in the flow rate measuring duct 11 with the notches 13 formed therein in each of deceleration and occurrence of a backward current.

First, the flow fashion of a constant flow in the flow rate measuring duct 11 without the notches 13 will be described, referring to FIG. 37. Since the downstream end of the flow rate measuring duct 11 lies on a plane perpendicular to the longitudinal axis 18 of the flow rate measuring duct 11, the current 23 that has passed through the flow rate measuring duct 11 and the current 24 that has passed outside the flow rate measuring duct 11 merge at the same location in the circumferential direction on coordinates in the flow direction. After annular-shaped stable and cyclic vortexes 90 are generated by shear force acting on a boundary surface of the merged currents, the annular-shaped vortexes change into discrete vortexes 55 and collapse eventually. The annular-shaped vortexes 90 lie on planes perpendicular to the longitudinal axis 18 and are stable since the annular-shaped vortexes hold a circular shape. However, as the annular-shaped vortexes move downstream, they are broken into discrete vortexes 55 by a disturbing component contained in the flow and are eventually collapsed.

Explanation of the flow fashion in occurrence of acceleration will be omitted since constriction in a mixing region in a rear flow behind the flow rate measuring duct prevents an error in flow rate measurement from being produced though the annular-shaped vortexes 90 are formed.

When deceleration is caused in a pulsating flow, the mixing region of the rear flow expands to make the discrete vortexes massive as shown in FIG. 39. As a result, the discrete vortexes occupy a large portion in the vicinity of the outlet of the flow rate measuring duct. Since the discrete vortexes block the advance of the current 23 that has passed through the flow rate measuring duct, the flow velocity of the current 23 lowers, producing an error in flow rate measurement at the flow rate measuring device 1.

When a backward current is caused, the discrete vortexes 55 that have become massive in deceleration are carried on the backward current to move upstream, being separated in and outside the flow rate measuring duct 11 as shown in FIG. 40. In this case, the flow rate detector 12 in the flow rate measuring duct 11 detects an irregular disturbing component caused by the vortexes irrespective of the principal current, producing an error in flow rate measurement at the flow rate measuring device 1.

Next, the flow movement in a constant flow with respect to the flow rate measuring duct with the notches 13 formed therein will be described, referring to FIG. 5. The current 23 that has passed through the flow rate measuring duct 11 and the current 24 that has passed outside the flow rate measuring duct 11 merge at different locations in the flow direction since the flow rate measuring duct has portions with the notches 13 formed therein and portions without the notches 13 formed therein. As a result, the annular-shaped vortexes 90 take a shape with different portions shifted in the flow direction without being formed in a circular shape with respect to the longitudinal axis 18. Such annular-shaped vortexes having a non-circular shape are unstable, are promptly separated and eventually collapse as discrete vortexes.

In deceleration, the annular-shaped vortexes are also apt to collapse as in a constant flow, being promptly separated into discrete vortexes. In comparison with the absence of notches as shown in FIG. 39, the discrete vortexes 55 are less massive since the annular-shaped vortexes lose stability and collapse promptly before developing into a massive form. Since the provision of the notches 13 reduces the occupied area of the discrete vortexes 55 in the vicinity of the outlet of the flow rate measuring duct 11, the current 23 that has passed through the flow rate measuring duct 11 is hardly susceptible to a decrease in a flow velocity in comparison with the absence of the notches 13. This means that the flow rate measuring device can correctly measure a flow rate with a rectifying effect offered by the flow rate measuring duct in a constant flow and a pulsating flow since a variation in a separation ratio of the currents in and outside of the flow rate measuring duct 11 is reduced.

In the case of occurrence of a backward current shown in FIG. 7, the provision of the notches 13 can reduce irregular disturbance caused by collision of the discrete vortexes 55 against the flow rate detector 12, and the flow rate measuring device 1 can correctly measure a flow rate since the discrete vortexes 55 that move upstream are less massive in comparison with the absence of notches shown in FIG. 40.

As explained, the flow rate measuring device 1 is set so that a total flow rate of intake air into the flow rate measuring device 1 and an output from the flow rate detector 12 in the flow rate measuring duct 11 are prechecked with respect to a constant flow and that the flow rate measuring device grasps the relationship between each total flow rate and each output as a function. If a flow changes from a constant flow into a pulsating flow, a total flow rate of intake air into the flow rate measuring device is estimated based on an output from the flow rate detector 12. Even if a flow changes into a pulsating flow, the provision of the notches 13 in the flow rate measuring duct can reduce the occupied area of the speed vortexes 55 in the vicinity of the outlet of the flow rate measuring duct 11. As a result, the current 23 that has passed through the flow rate measuring duct 11 is hardly susceptible to a decrease in a flow velocity, and a variation in the separation ratio of the currents 23 and 24 in and outside of the flow rate measuring duct 11 is reduced in both constant flow and pulsating flow. The flow rate measuring device 1 can correctly measure a flow rate with the rectifying effect offered by the flow rate measuring duct 11 in a constant flow, a pulsating flow and a pulsating flow with a backward current contained therein since the discrete vortexes 55 that move upstream can become less massive in occurrence of a backward current. This means that the flow rate measuring device according to the present invention is suited to a pulsating flow with a backward current contained therein to some extent, in particular an intake system for an automobile internal combustion engine.

Next, the geometrical shape and arrangement of the notches 13 will be explained.

The annular-shaped vortexes 90 that are generated from the air flow behind the flow rate measuring duct 11 can be forcibly, reliably and rapidly separated into sections by the provision of the plural notches 13 in the flow rate measuring duct 11 in the circumferential direction with respect to the longitudinal axis 18. The separated vortexes collapse promptly as smaller and discrete vortexes. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

The annular-shaped vortexes that are generated from the rear flow behind the flow rate measuring duct 11 can be separated in sections at equal distances with respect to the longitudinal axis 18 of the flow rate measuring duct 11 by the provision of the plural notches 13 in the flow rate measuring duct 11 at equal distances in the circumferential direction with respect to the longitudinal axis 18. As a result, the size of the separated annular-shaped vortexes can be minimized. The separated vortexes collapse promptly as smaller and discrete vortexes. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

Since the provision of an odd number of the notches 13 in the flow rate measuring duct 11 at equal distances in the circumferential direction with respect to the longitudinal axis 18 upsets the symmetry of the annular-shaped vortexes 90 generating from the rear flow behind the flow rate measuring duct 11, the annular-shaped vortexes become unstable. The vortexes collapse promptly as smaller and discrete vortexes. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes 55. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

The separation width of the annular-shaped vortexes 90 that are generated from the rear flow behind the flow rate measuring duct 11 can be equalized in each of the notches 13 since the plural notches 13 having a congruent shape are provided in the flow rate measuring duct 11 in the circumferential direction with respect to the longitudinal axis 18. The separated vortexes collapse promptly as smaller and discrete vortexes 55. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

When the notches 13 are formed in a shape symmetrical with respect to an axis in parallel with the principal current, such as an isosceles triangle, the annular-shaped vortexes 90 are bent axisymmetrically with respect to the axis to strengthen mutual interference. The vortexes collapse promptly as discrete vortexes 55. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes. Thus, the flow rate measuring device 1 can reduce an error in flow rate detection in a constant flow, a pulsating flow and a pulsating flow with a backward current contained therein.

When the notches have a width gradually expanded toward the downstream direction of the flow rate measuring duct 11, the annular-shaped vortexes 90 that are generated from the rear flow behind the flow rate measuring duct 11 can be reliably separated into sections since the separation is made smoothly in the flow direction. The separated vortexes collapse promptly as smaller and discrete vortexes. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes 55. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

When the flow rate measuring duct 11 has a round downstream end like the upstream end, the occurrence of the separation in the vicinity of the downstream end of the flow rate measuring duct 11 can be minimized in occurrence of a backward current. The formation of the round downstream end can be made at a low cost when the duct is made of resin for example.

When the flow rate measuring duct 11 has a wall thickness of a portion thereof with the notches 13 formed therein decreased toward the downstream direction, the current 24 that has passed outside the flow rate measuring duct 11 and the current 23 that has passed through the flow rate measuring duct merge smoothly and mix vigorously together in the rear flow behind the flow rate measuring duct 11. The annular-shaped vortexes can be collapsed as smaller discrete vortexes 55. This arrangement can not only offer the rectifying effect by the flow rate measuring duct 11 but also reduce a variation in the separation ratio between the currents in and outside the flow rate measuring duct in a constant flow and a pulsating flow. Even if the discrete vortexes move upstream by occurrence of a backward current, this arrangement can minimize the magnitude of the discrete vortexes 55. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

In order to suck out the discrete vortexes 55 from inside toward outside the flow rate measuring duct 11 by generating a separation region 56 as outwardly as possible while merging both currents smoothly, the flow rate measuring duct may have an outer diameter of a portion thereof with the notches 13 formed therein decreased toward the downstream direction so that the portion has a certain slant angle 35 with respect to the outer diameter of a central portion of the duct as shown as an enlarged view of the essential portion in FIG. 8. Although the slant angle may be arbitrarily selected, it is preferable that the slant angle is set to an angle to easily generate separation in a constant flow and a pulsating flow. In the case of a constant flow, the slant angle is generally substantially not lower than 10 degrees and lower than 90 degrees.

In such arrangement, the current 24 that passes between the outer wall of the flow rate measuring duct 11 and the inner wall of the principal current passage 10 separates from an outer diameter decreasing portion of the flow rate measuring duct 11 to form the separation region 56 in a constant flow and a pulsating flow as shown in FIG. 8. The separation region 56 is formed in the vicinity of the notches 13 and have a negative pressure. The currents 23 and 24 in and outside the flow rate measuring duct 11 can smoothly merge and mix vigorously since the portion of the duct with the notches 13 formed therein has the decreased wall thickness in the downstream direction. The discrete vortexes that are generated at the notches 13 in the flow rate measuring duct 11 are sucked out by being carried on a current from inside toward outside through the notches 13, and collapse as discrete vortexes 55 while moving downstream.

Since the flow rate measuring duct 11 has the outer diameter decreased toward downstream at the portion with the notches 13 formed therein as explained, the current 24 that has passes outside the flow rate measuring duct and the current 23 that has passed through the flow rate measuring duct merge smoothly. The annular-shaped vortexes 90 that are generated from the rear flow behind the flow rate measuring duct can be sucked out from inside toward outside by the merged currents. The occupied area of the separated discrete vortexes 55 in the vicinity of the outlet of the flow rate measuring duct 11 is reduced since the separated discrete vortexes move outside the flow rate measuring duct 11. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

Although the flow rate measuring duct 11 is formed in a cylindrical shape in this embodiment, the flow rate measuring duct may be formed in various shapes having an oval shape, a triangular shape, a square shape or a trapezoidal shape in section perpendicular to the longitudinal axis of the duct, offering similar effects. This applies to each of the following embodiments as well.

Although the number of the notches 13 is five in this embodiment, a larger number of the notches 13 can offer a greater effect in separation of the vortexes.

This embodiment is effective against measurement of intake air flow rate for automobile but also flow rate measurement for fluid devices in general, in particular for a fluid containing a pulsating flow. This applies to each of the following embodiments as well.

Embodiment 2

Figure 9:
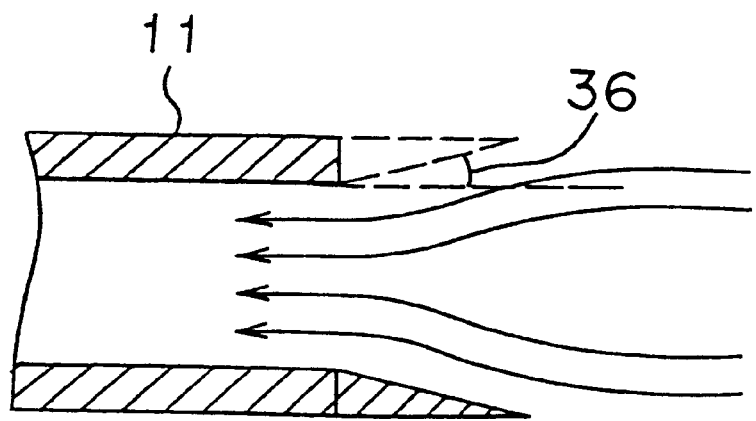
FIG. 9 is an enlarged cross-sectional view to show an essential portion of the flow rate measuring duct according to a second embodiment of the present invention and to explain flow fashion offered by the duct.

In FIG. 9 is shown a schematic view of an essential portion of the flow rate measuring duct 11 according to a second embodiment of the present invention, wherein the function of the duct is shown. As shown in FIG. 9, the flow rate measuring duct 11 can have an inner diameter thereof increased in the downstream direction to decrease, in the downstream direction, the wall thickness of the duct 11 with the notches 13 formed therein. The current that has passed outside the flow rate measuring duct 11 and the current that has passed through the flow rate measuring duct 11 merge smoothly when the flow is directed toward the forward direction. The annular-shaped vortexes 90 that generate from the rear flow behind the flow rate measuring duct 11 can be separated into the discrete vortexes 55. When the flow includes a backward current, the contraction of the flow rate measuring duct 11 can reduce turbulence. A slant angle 36 is preferably such an angle to avoid separation. This is because the annular-shaped vortexes 90 that produce separation in a constant flow and a pulsating flow are sucked out from outside into inside the flow rate measuring duct 11 and because the occupied area of the discrete vortexes 55 in the vicinity of the outlet of the flow rate measuring duct increases. In general, the angle to make separation difficult is greater substantially than 0 degree and not less than 10 degrees.

The arrangement according to this embodiment can not only offer the rectifying effect by the flow rate measuring duct 11 but also reduce a variation in the separation ratio between the currents in and outside the flow rate measuring duct 11 in a constant flow and a pulsating flow. Even if a backward current is generated, this arrangement can reduce an error in flow rate detection by a contraction effect.

In the arrangement shown in FIG. 2, a gradual decrease in the outer diameter and a gradual increase in the inner diameter are both applied to decrease, in the downstream direction, the wall thickness of the duct 11 with the notches 13 formed therein.

Embodiment 3

Figure 10:
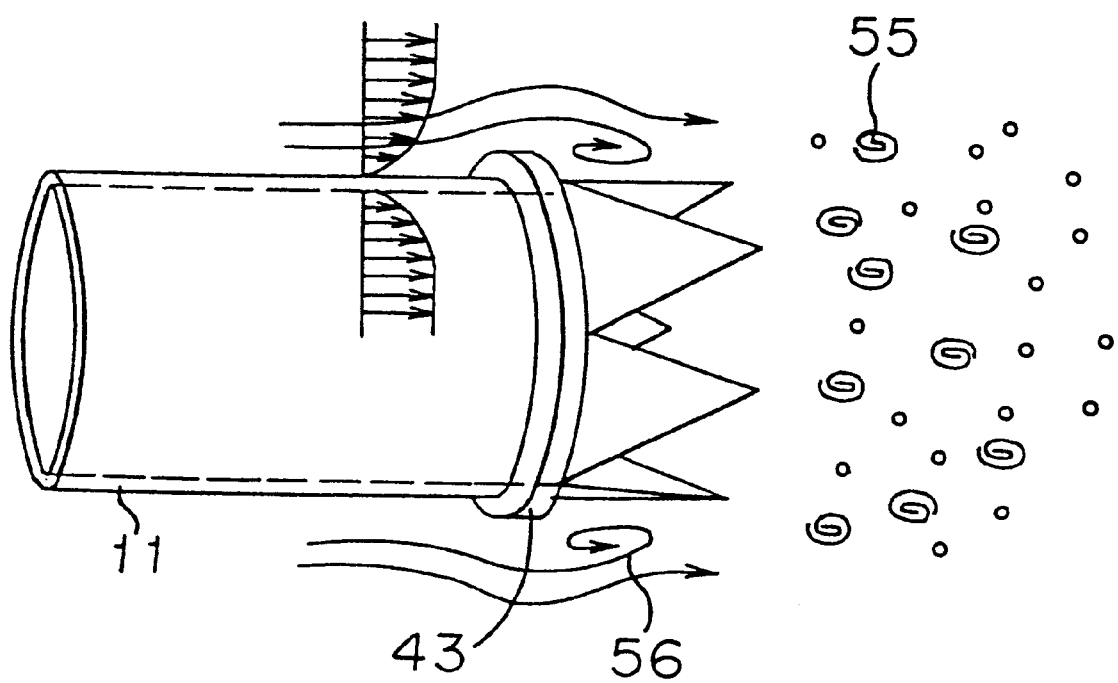
FIG. 10 is a schematic view to show the flow rate measuring duct according to a third embodiment of the present invention and to explain flow fashion offered by the duct in a constant flow.
Figure 11:
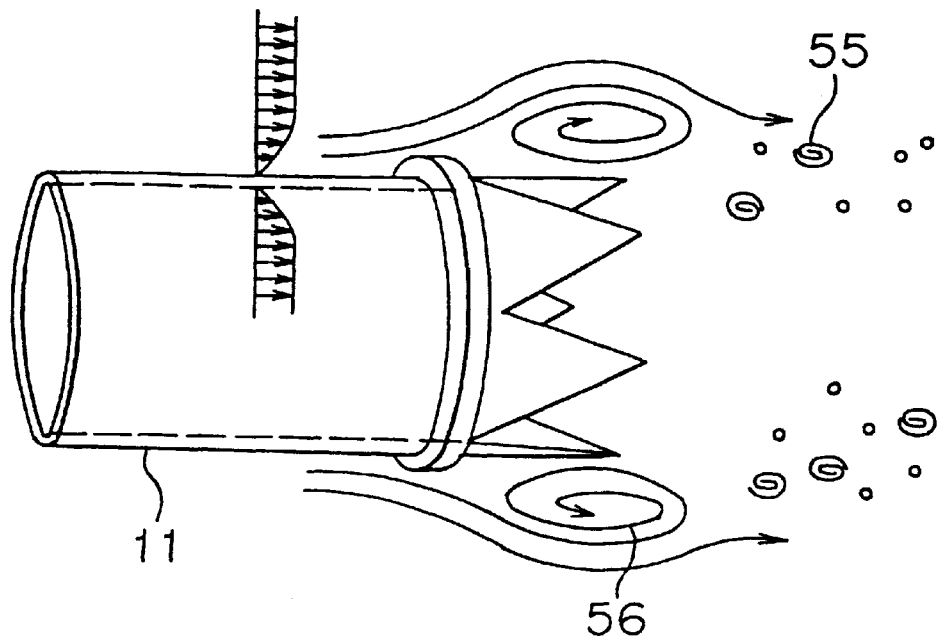
FIG. 11 is a schematic view to show the flow rate measuring duct according to the third embodiment and to explain flow fashion offered by the duct in occurrence of deceleration.
Figure 12:
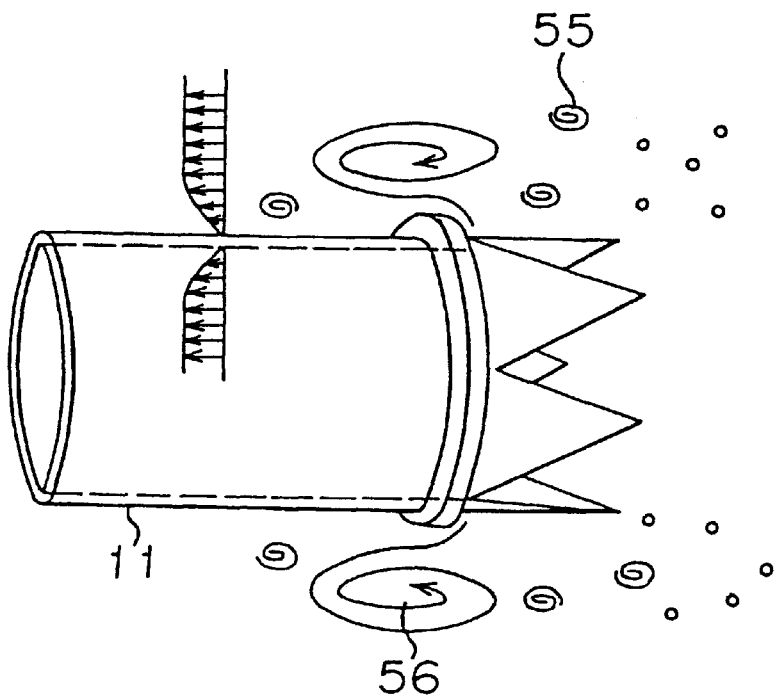
FIG. 12 is a schematic view to show the flow rate measuring duct according to the third embodiment and to explain flow fashion offered by the duct in occurrence of a backward current.

In FIGS. 10–12 is shown the flow rate measuring duct according to a third embodiment of the present invention wherein the function of the duct is shown. This embodiment proposes an arrangement to further improve the effects offered by the notches 13. In these figures, reference numeral 43 designates a ring-shaped projection, which is provided on the outer wall of the flow rate measuring duct 11 upstream the notches 13 so as to surround the longitudinal axis 18 of the flow rate measuring duct 11 in the circumferential direction. The height of the projection 43 from the outer wall of the flow rate measuring duct 11 is substantially equal throughout the entire circumference.

Now, the function of this arrangement will be explained. Before explaining the function in a pulsating flow, the function in a constant flow will be explained. Referring to FIG. 10, the separation region 56 is produced in the rear flow behind the projection 43. Since the separation region 56 provides a negative pressure, the current 23 that has passed through the flow rate measuring duct 11 is sucked out from inside through the notches, and merges with the current 24 outside the flow rate measuring duct 11. In comparison with the absence of the notches 13 or the provision of the notches 13 without the projection 43, the merged currents directly collapse into the discrete vortexes 55 without generation of the annular-shaped vortexes 90. The discrete vortexes 55 move downstream, being deflected toward an outer circumferential direction.

By the provision of the projection, the occupied area of the discrete vortexes 55 in the vicinity of the outlet of the flow rate measuring duct 11 can be decreased in comparison with the absence of the notches 13 or the provision of the notches 13 without the projection 43, minimizing a decrease in flow velocity of the current that has passed through the flow rate measuring duct 11.

Now, the function in the case of a pulsating flow in deceleration will be explained, referring to FIG. 11. When the flow decelerates, the separation region 56 in the rear flow behind the projection 43 expands. Since the force to suck out the current from inside toward outside increases in the separation region in comparison with the case of a constant flow, the discrete vortexes move downstream, being deflected toward the outer circumferential direction.

By the provision of the projection, the occupied area of the discrete vortexes 55 in the vicinity of the outlet of the flow rate measuring duct 11 can be decreased in comparison with the absence of the notches 13 or the provision of the notches 13 without the projection 43, minimizing a decrease in flow velocity of the current that has passed through the flow rate measuring duct 11. Since this arrangement can reduce a variation in the separation ratio between the currents in and outside the flow rate measuring duct 11 in a constant flow and a pulsating flow, the flow rate measuring device 11 can correctly measure a flow rate, offering the rectifying effect by the flow rate measuring duct 11.

Now, the function in the case of a backward current will be explained, referring to FIG. 12. Since the discrete vortexes 55 are sucked out from inside toward outside the flow rate measuring duct 11 by the massive separation region 56 during deceleration of the flow as explained, most of the discrete vortexes 55 move upstream outside the flow rate measuring duct 11 when the backward current starts. This means that the discrete vortexes 55 are prevented from coming into the flow rate measuring duct 11 to avoid collision of the vortexes against the flow rate detector 12, producing no detection error in a flow rate caused by the collision of the vortexes.

The flow rate measuring device 1 can correctly measure a flow rate since a detection error is reduced at the flow rate detector 12 provided in the flow rate measuring duct 11.

Figure 13:
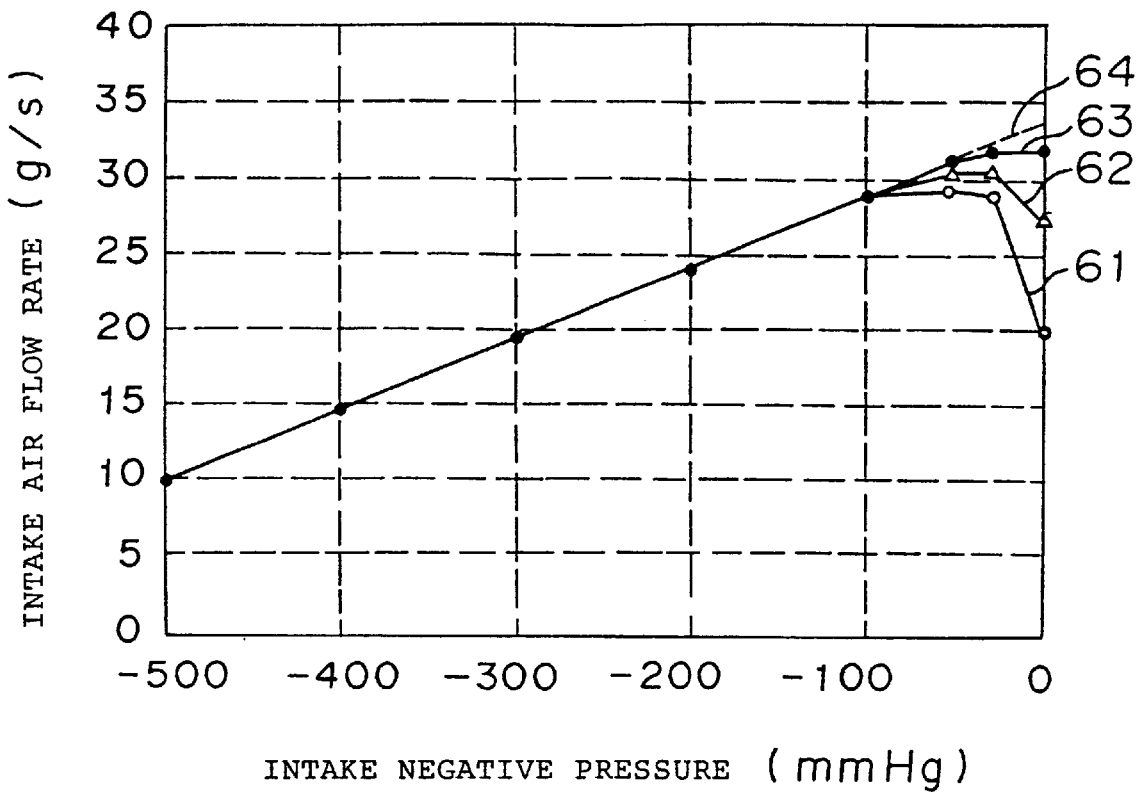
FIG. 13 is a graph to show measurements obtained by the flow rate measuring devices according to the first through third embodiments.

In FIG. 13 are shown the data of intake air flow rate that were actually measured at a four-cylinder engine having a piston displacement of 2,000 cc at 2,000 rpm. In this figure, reference numeral 64 designates a ideal flow rate that is obtained when it is supposed that flow rates of the intake air into the engine has a linear relationship with intake negative pressures. Reference numeral 61 designates the flow rates that were actually measured at the conventional flow rate measuring duct 11 without the notches 13. Reference numeral 62 designates the flow rates that were actually measured at the flow rate measuring duct 11 with the notches 13 according to the first embodiment. Reference numeral 63 designates the flow rates that were actually measured at the flow rate measuring duct with the notches 13 and the projection 43 according to the third embodiment. The data show that the flow rates for the duct with the notches 13 are nearer to the ideal flow rates 64 than those for the duct without the notches 13, and that the flow rates for the duct with the notches 13 and the projection 43 are much nearer to the ideal flow rates 64 than those for the duct without the notches 13.

As explained, the flow rate measuring device 1 is set so that a total flow rate of intake air into the flow rate measuring device 1 and an output from the flow rate detector 12 in the flow rate measuring duct 11 are prechecked with respect to a constant flow and that the flow rate measuring device grasps the relationship between each total flow rate and each output as a function. If a flow changes into a pulsating flow, a total flow rate of intake air into the flow rate measuring device is estimated based on an output from the flow rate detector 12. By the provision of the notches 13 and the projection 43, the occupied area of the discrete vortexes 55 in the vicinity of the outlet of the flow rate measuring duct 11 can be decreased, minimizing a decrease in flow velocity in the current that has passed through the flow rate measuring duct 11 even if the flow changes from a constant flow into a pulsating flow. A variation in a separation ratio between the current 23 passing through the flow rate measuring duct 11 and the current 24 passing outside the flow rate measuring duct 11 can be reduced in a constant flow and a pulsating flow. Even if the discrete vortexes move upstream by occurrence of a backward current, this arrangement can minimize the magnitude of the discrete vortexes and cause the discrete vortexes to pass outside the duct. Thus, the flow rate measuring device can correctly measure a flow rate, offering the rectifying effect by the flow rate measuring duct 11 in a constant flow, a pulsating flow and a pulsating flow with a backward current contained therein. This means that the flow rate measuring device according to this embodiment is suited a pulsating flow with a backward current contained therein to some extent, in particular an induction system for an automobile internal combustion engine.

Although five of the notches 13 are provided in this embodiment, a larger number of the notches 13 can offer a greater effect in separation of the vortexes.

When the portion of the duct with the notches 13 formed therein is formed in such an edge 16 to have a gradual decrease in the wall thickness toward the downstream direction, the edge is effective to smoothly merge the currents in and outside the flow rate measuring duct 11.

Embodiment 4

Figure 14:
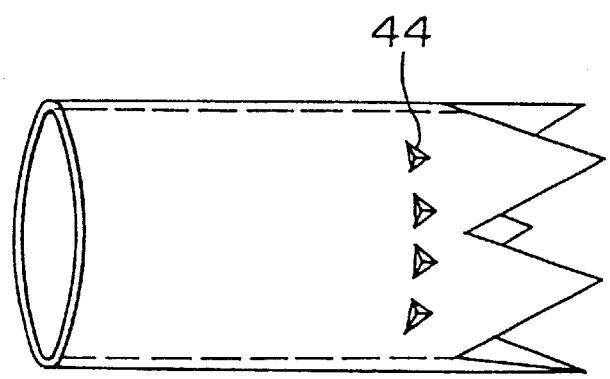
FIG. 14 is a perspective view of the flow rate measuring duct according to a fourth embodiment of the present invention.

In FIG. 14 is shown a perspective view of the flow rate measuring duct according to a fourth embodiment of the present invention. In this figure, reference numeral 44 designates one of discontinuous projections, which are provided on the outer wall of the flow rate measuring duct 11 upstream the notches 13, and which line in the circumferential direction with respect to the longitudinal axis 18 of the flow rate measuring duct 11. The discontinuous projections 44, which are provided as projections sectioned in the circumferential direction with respect to the longitudinal axis 18 of the flow rate measuring duct 11 in accordance with this embodiment, can offer effects similar to the ring-shaped projection 43 according to the third embodiment.

The discontinuous projections 44 may be formed in various shapes to produce the separation region 56 behind the duct, such as a triangular pyramid shape, a circular cone shape and a rectangular parallelopiped shape. There are no limitation on a combination of shapes, the number and the size of the discontinuous projections.

Embodiment 5

Figure 15:
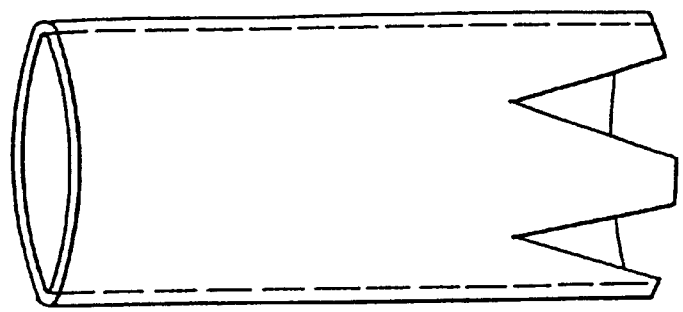
FIG. 15 is a perspective view of the flow rate measuring duct according to a fifth embodiment of the present invention.

In FIG. 15 is shown a perspective view of the flow rate measuring duct according to a fifth embodiment of the present invention. Although notch ratio, or ratio of the notched portions to the entire length in the circumferential direction at the downstream end of the flow rate measuring duct 11 is 100% in the respective embodiments, even this embodiment with 50% of notch ratio can offer effects similar to the respective embodiments since separation of the annular-shaped vortexes 90 and subdivision into the discrete vortexes 55 are likewise carried out.

The notch ratio is not limited to that in this embodiment, and the notch ratio may be arbitrarily selected.

Embodiment 6

Now, another arrangement for the flow rate measuring duct 11, which can offer effects similar to the provision of the notches 13, will be explained.

Figure 16:
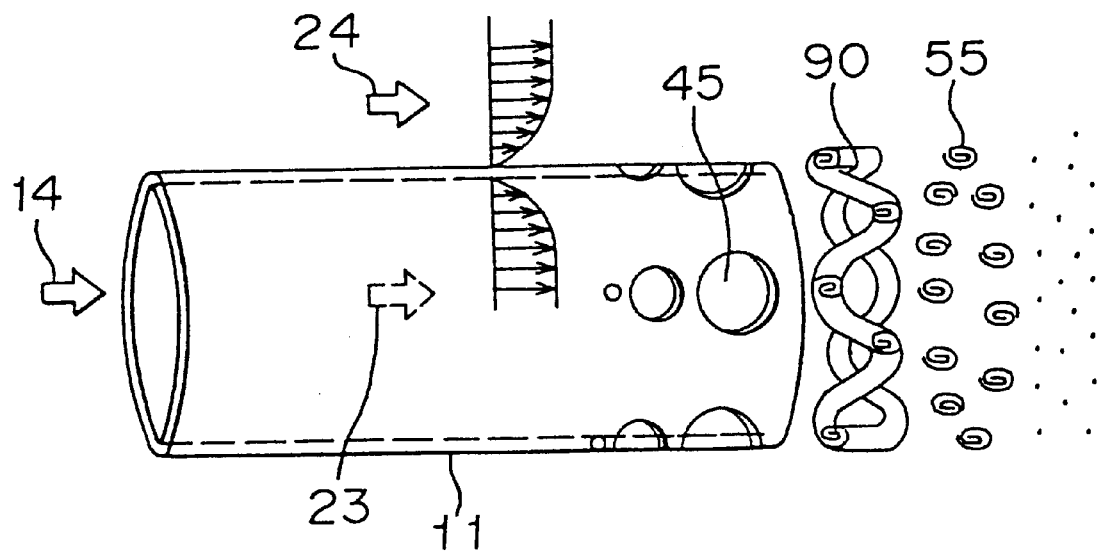
FIG. 16 is a schematic view of to show the flow rate measuring duct according to a fifth embodiment of the present invention and to explain flow fashion offered by the duct in a constant flow.
Figure 17:
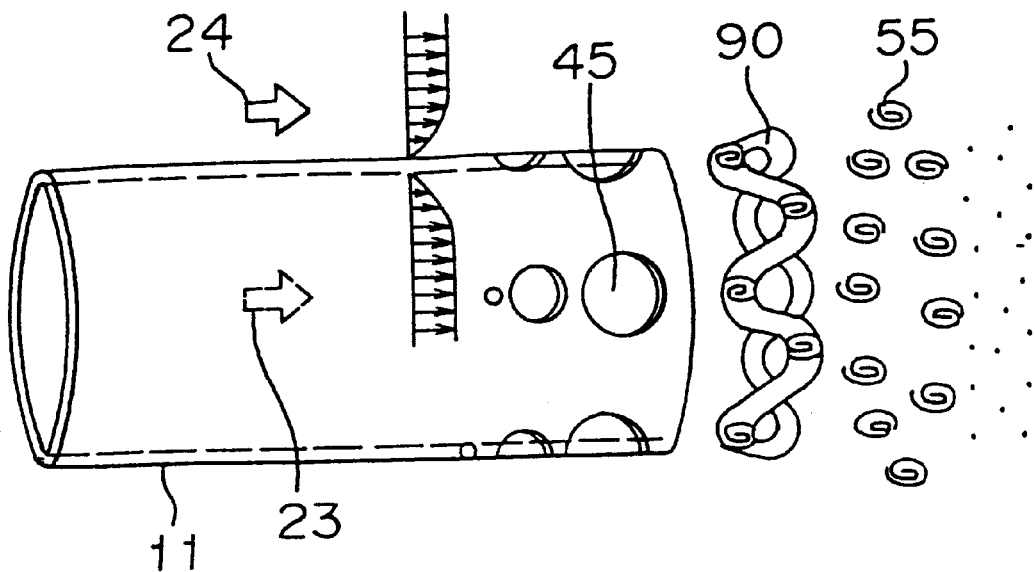
FIG. 17 is a schematic view to show the flow rate measuring duct according to a sixth embodiment and to explain flow fashion offered by the duct in occurrence of deceleration.
Figure 18:
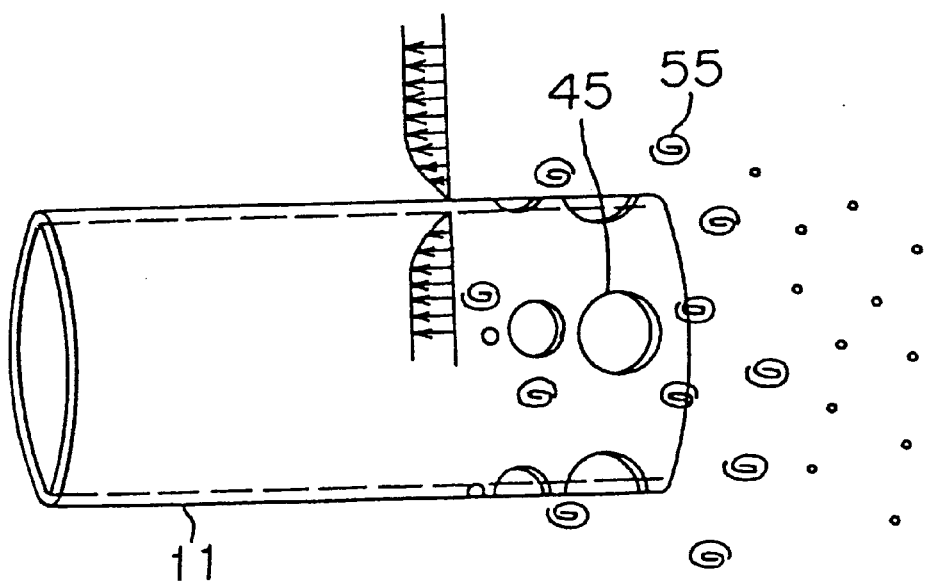
FIG. 18 is a schematic view to show the flow rate measuring duct according to the sixth embodiment and to explain flow fashion offered by the duct in occurrence of a backward current.

In FIGS. 16 through 18 is shown the flow rate measuring duct according to a sixth embodiment of the present invention, wherein the function of the duct is shown.

In these figures, reference numeral 45 designates one of through holes 45, which are formed in the flow rate measuring duct 11 in the vicinity of the downstream end in the normal flow direction 14, and which pass through the duct wall. In this embodiment, the through holes 45 are provided in three rows in the flow direction 14 and are provided at five locations at equal distances in the circumferential direction with respect to the longitudinal axis 18 of the flow rate measuring duct 11 in the respective rows. The through holes 45 on the same rows are congruent in the circumferential direction, or formed in the same shape and the same size. The through holes 45 in a downstream row have an opening area thereof gradually increased in the flow direction 14 in comparison with the through holes in an upstream row, and the through holes 45 in the same line in the flow direction have centers thereof aligned each other along the flow direction 14.

Before explaining the function of the duct in a pulsating flow, the function of the duct in a constant flow will be explained, referring to FIG. 16. As with the provision of the notches 13 according to the first embodiment, the current 24 that has passed outside the flow rate measuring duct 11 and the current 23 that has passed through the flow rate measuring duct 11 mix and become unstable when passing on the wall with the plural through holes 45 having a gradually increased area. As a result, as in the provision of the notches 13, the annular-shaped vortexes 90 take a shape with different portions shifted in the flow direction without being formed in a circular shape with respect to the longitudinal axis 18. Such annular-shaped vortexes having a non-circular shape are unstable, are promptly separated and eventually collapse as discrete vortexes 55.

Since the provision of the through holes 45 reduces the occupied area of the discrete vortexes 55 in the vicinity of the outlet of the flow rate measuring duct 11, the current 23 that has passed through the flow rate measuring duct 11 is hardly susceptible to a decrease in a flow velocity in comparison with the absence of the through holes 45. This means that flow rate measuring device can correctly measure a flow rate with a rectifying effect offered by the flow rate measuring duct 11 in a constant flow and a pulsating flow since a variation in the separation ratio of the currents in and outside of the flow rate measuring duct 11 is reduced.

Next, the function of the duct in a pulsating flow in deceleration will be explained, referring to FIG. 17. Even in deceleration, the annular-shaped vortexes are promptly separated, and discrete vortexes 55 are produced since the annular-shaped vortexes are apt to collapse as in a constant flow. In comparison with the absence of the through holes as shown in FIG. 39, the discrete vortexes 55 are less massive since the annular-shaped vortexes lose stability and collapse promptly before developing into a massive form.

Since the provision of the through holes 45 reduces the occupied area of the discrete vortexes 55 in the vicinity of the outlet of the flow rate measuring duct 11, the current 23 that has passed through the flow rate measuring duct 11 is hardly susceptible to a decrease in a flow velocity in comparison with the absence of the through holes 45. This means that the flow rate measuring device 1 can correctly measure a flow rate with the rectifying effect offered by the flow rate measuring duct 11 in a constant flow and a pulsating flow since a variation in the separation ratio of the currents in and outside of the flow rate measuring duct 11 is reduced.

In the case of occurrence of a backward current as shown in FIG. 18, the provision of the through holes 45 can reduce the magnitude of the discrete vortexes 55 moving upstream in comparison with the absence of the through holes shown in FIG. 40. As a result, the flow rate measuring device 1 can correctly measure a flow rate since the irregular disturbance that occurs when the discrete vortexes 55 collides with the flow rate detector 12 is reduced.

As explained, the flow rate measuring device 1 is generally set so that a total flow rate of intake air into the flow rate measuring device 1 and an output from the flow rate detector 12 in the flow rate measuring duct 11 are prechecked with respect to a constant flow and that the flow rate measuring device grasps the relationship between each total flow rate and each output as a function. If a flow changes from a constant flow into a pulsating flow, a total flow rate of intake air into the flow rate measuring device 1 is estimated based on an output from the flow rate detector 12. By the provision of the through holes 45, the occupied area of the discrete vortexes 55 in the vicinity of the outlet of the flow rate measuring duct 11 can be decreased, minimizing a decrease in a flow velocity of the current 23 that has passed through the flow rate measuring duct 11, even if the flow changes into a pulsating flow. This arrangement can reduce a variation in the separation ratio between the current 23 that has passes through the flow rate measuring duct 11 and the current 24 that has passed outside the flow rate measuring duct 11. Even if the discrete vortexes 55 move upstream by occurrence of a backward current, this arrangement can minimize the magnitude of the discrete vortexes 55. Thus, the flow rate measuring device 1 can not only offer the rectifying effect by the flow rate measuring duct 11 but also correctly measure a flow rate in a constant flow, a pulsating flow and a pulsating flow with a backward current contained therein. This means that the flow rate measuring device according to this embodiment is suited to a pulsating flow with a backward current contained therein to some extent, in particular an induction system for an automobile internal combustion engine.

Now, the geometrical shape and the arrangement of the through holes 45 will be described.

The annular-shaped vortexes 90 that are generated from the rear flow behind the flow rate measuring duct 11 can be forcibly separated into sections by the provision of the plural through holes 45 in the circumferential direction with respect to the longitudinal axis 18 of the flow rate measuring duct 11. The separated vortexes collapse promptly as smaller and discrete vortexes. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes. Thus, the flow rate measuring device 1 can not only offer the rectifying effect by the flow rate measuring duct 11 but also reduce an error in flow rate direction in a constant flow, a pulsating flow and a pulsating flow with a backward current contained therein.

By the provision of the through holes 45 at equal distances in the circumferential direction with respect to the longitudinal axis 18 of the flow rate measuring duct 11, the annular-shaped vortexes 90 that are generated from the rear flow behind the flow rate measuring duct 11 can be separated into sections at equal distances with respect to the longitudinal axis 18 of the flow rate measuring duct so as to minimize the magnitude of the separated annular-shaped vortexes 90. The separated vortexes collapse promptly as smaller and discrete vortexes 55. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes move upstream by occurrence of a backward current, this arrangement can minimize the magnitude of the discrete vortexes 55. Thus, the flow rate measuring duct 1 can not only offer the rectifying effect by the flow rate measuring duct 11 but also reduce an error in flow rate detection in a constant flow, a pulsating flow and a pulsating flow with a backward current contained therein.

The through holes 45 may be provided at an odd number of locations and at equal distances in the circumferential direction with respect to the longitudinal axis 18 of the flow rate measuring duct 11. In this case, the annular-shaped vortexes 90 that are generated from the flow behind the flow rate measuring duct 11 are made unstable by upsetting their symmetry. The vortexes collapse promptly as smaller and discrete vortexes 55. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes move upstream by occurrence of a backward current, this arrangement can minimize the magnitude of the discrete vortexes 55. Thus, the flow rate measuring device can not only offer the rectifying effect by the flow rate measuring duct 11 but also reduce an error in flow rate detection in a constant flow, a pulsating flow and a pulsating flow with a backward current contained therein.

The annular-shaped vortexes 90 that are generated from the rear flow behind the flow rate measuring duct 11 can be reliably separated into sections since the separation is made smoothly in the flow direction by the provision of the through holes 45 in a plurality of rows in the flow direction in the flow rate measuring duct 11. The separated vortexes collapse promptly as smaller and discrete vortexes 55. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes 55. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

Since the through holes 45 in the same line in the flow direction have centers thereof substantially aligned in the flow direction, the currents in and outside the flow rate measuring duct can be successively merged. As a result, the annular-shaped vortexes 90 that are generated from the rear flow behind the flow rate measuring duct 11 can be reliably separated into sections since the separation is made smoothly in the flow direction. The separated vortexes collapse promptly as smaller and discrete vortexes 55. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes 55. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

The through holes 45 are provided so that the through holes 45 in a downstream side of the flow rate measuring duct 11 have a greater opening area than the through holes in an upstream side thereof. As a result, the annular-shaped vortexes 90 that are generated from the rear flow behind the flow rate measuring duct 11 can be reliably separated into sections since the separation is made smoothly in the flow direction. The separated vortexes collapse promptly as smaller and discrete vortexes 55. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes move upstream by occurrence of a backward current, this arrangement can minimize the magnitude of the discrete vortexes 55. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

The wall of the duct 11 with the through holes 45 formed therein may have a wall thickness thereof gradually decreased in the downstream direction. The current 24 that has at outside the flow rate measuring duct and the current 3 that has passed through the flow rate measuring duct merge smoothly and mix together difference in the rear flow behind the flow rate measuring duct 11. The annular-shaped vortexes 90 can be collapsed promptly as smaller and discrete vortexes 55. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes 55. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

The portion of the flow rate measuring duct 11 with the through holes 45 formed therein may have a wall thickness thereof gradually decreased in the downstream direction. In this case, the through holes 45 are provided in a portion of the flow rate measuring duct 11 that has an outer diameter thereof gradually decreased in the downstream direction as in one mode of the first embodiment shown in FIG. 8. As a result, the current 24 that has passed outside the flow rate measuring duct and the current 23 that has passed through the flow rate measuring duct merge smoothly. In addition, the annular-shaped vortexes 90 that are generated from the rear flow behind the flow rate measuring duct 11 can be sucked out from inside toward outside by the merged currents. The occupied area of the separated discrete vortexes 55 in the outlet of the flow rate measuring duct since most of the separated discrete vortexes move outside the flow rate measuring duct 11. This arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes 55 move upstream by occurrence of a backward current, this arrangement can minimize the magnitude of the discrete vortexes 55. Thus, the flow rate measuring device 1 can not only offer the rectifying effect by the flow rate measuring duct 11 but also reduce an error in flow rate detection in a constant flow, a pulsating flow and a pulsating flow with a backward current contained therein.

In order that the portion of the flow rate measuring duct 11 with the through holes 45 formed therein has a wall thickness thereof gradually decreased in the downstream direction, the flow rate measuring duct 11 may have an inner diameter thereof at that portion expanded toward the downstream direction as in the second embodiment shown in FIG. 9. In this case, the current that has passed outside the flow rate measuring duct 11 and the current that has passed through the flow rate measuring duct 11 merge smoothly when the flow is directed to the forward direction. The annular-shaped vortexes 90 that are generated from the rear flow behind the flow rate measuring duct 11 can be separated into discrete vortexes 55. When the flow is directed to the backward direction, the contraction of the flow rate measuring duct 11 can reduce turbulence.

Thus, this arrangement can not only offer the rectifying effect by the flow rate measuring duct 11 but also reduce a variation in the separation ratio between the currents in and outside the flow rate measuring duct 11 in a constant flow and a pulsating flow. Even if a backward current is generated, this arrangement can reduce an error in flow rate detection by a contraction effect.

It is preferable that the slant angle 36 is such an angle to avoid separation. This is because the annular-shaped vortexes 90, which produce separation in a constant flow and a pulsating flow, are sucked from outside into inside the flow rate measuring duct 11, and because the occupied area of the discrete vortexes 55 in the vicinity of the outlet of the flow rate measuring duct increases in both flows. In the case of a constant flow, the angle to make the occurrence separation difficult is generally substantially greater than 0 degree and not higher than 10 degrees.

Although five of the through holes 45 are provided in the respective rows in the circumferential direction with respect to the longitudinal axis of the flow rate measuring duct 11 in this embodiment, the present invention is not limited to this arrangement. A larger number of the through holes 45 can offer a greater effect in separation of the vortexes.

Although explanation of this embodiment has been made with respect to the case wherein the through holes 45 are provided in three rows in the flow direction, the present invention is not limited to this arrangement. A greater number of rows are preferable in terms of gradual merger between the currents 23 and 24 that have passed through and outside the flow rate measuring duct 11.

The shape of the through holes 45 is not limited to a circular shape. The through holes may be formed in various shapes.

Embodiment 7

Figure 19:
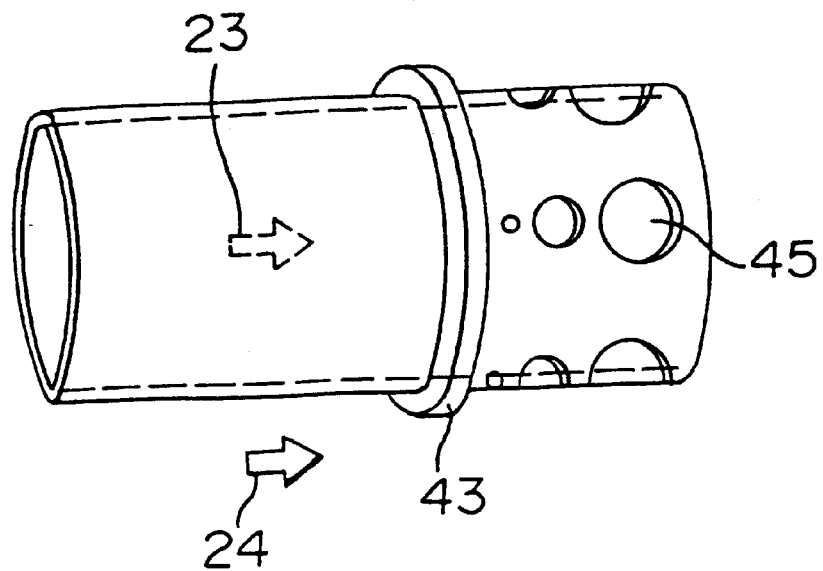
FIG. 19 is a perspective view of the flow rate measuring duct according to a seventh embodiment of the present invention.

In FIG. 19 is shown a perspective view of the flow rate measuring duct according to a seventh embodiment of the present invention. According to this embodiment, the effect offered by the through holes 45 can be further enhanced. The projection 43 is formed on an outer wall of the flow rate measuring duct 11 upstream the through holes 45 to provide an abrupt change in the wall thickness of the duct 11. As a result, if the flow changes from a constant flow into a pulsating flow, the current 23 that has passed through the flow rate measuring duct 11 is hardly susceptible to a decrease in a flow velocity since the provision of the projection reduces the occupied area of the discrete vortexes 55 in the vicinity of the outlet of the flow rate measuring duct 11 as explained with respect to the provision of the notches 13 and the projection 43 according to the third embodiment. Thus, a variation in the separation ratio between the current 23 that has passed through the flow rate measuring duct 11 and the current 24 that has passed outside the duct can be reduced in a constant flow and a pulsating flow. Even if the discrete vortexes 55 move upstream by occurrence of a backward current, this arrangement can minimize the magnitude of the discrete vortexes 55 and cause the discrete vortexes to pass outside the duct. The flow rate measuring device 1 can not only offer the rectifying effect by the flow rate measuring duct 11 but also correctly measure a flow rate in a constant flow, a pulsating flow and a pulsating flow with a backward current contained therein. Detailed explanation of the function offered by the projection 43 will be omitted since explanation of the third embodiment is also applied.

Even if the discontinuous projections, which can be formed by separating the ring-shaped projection 43 into the circumferential direction with respect to the longitudinal axis 18 of the flow rate measuring duct 11, are provided instead of the ring-shaped projection 43, similar effects can be obtained as in the fourth embodiment.

Embodiment 8

Next, another arrangement of the flow rate measuring duct 11, which can offer effects similar to the notches 13 or the through holes 45, will be explained.

Figure 20:
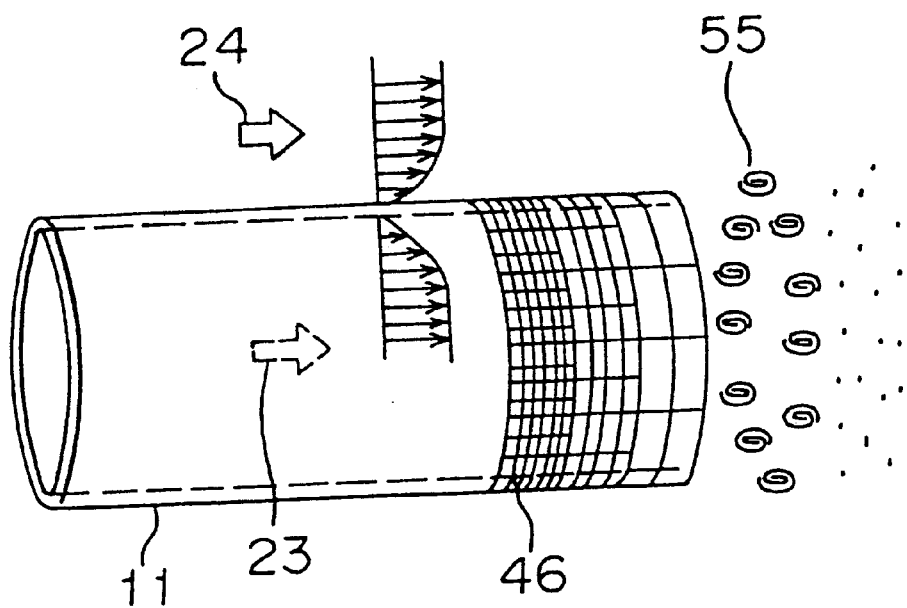
FIG. 20 is a schematic view to show the flow rate measuring duct according to an eighth embodiment of the present invention and to explain flow fashion offered by the duct in a constant flow.
Figure 21:
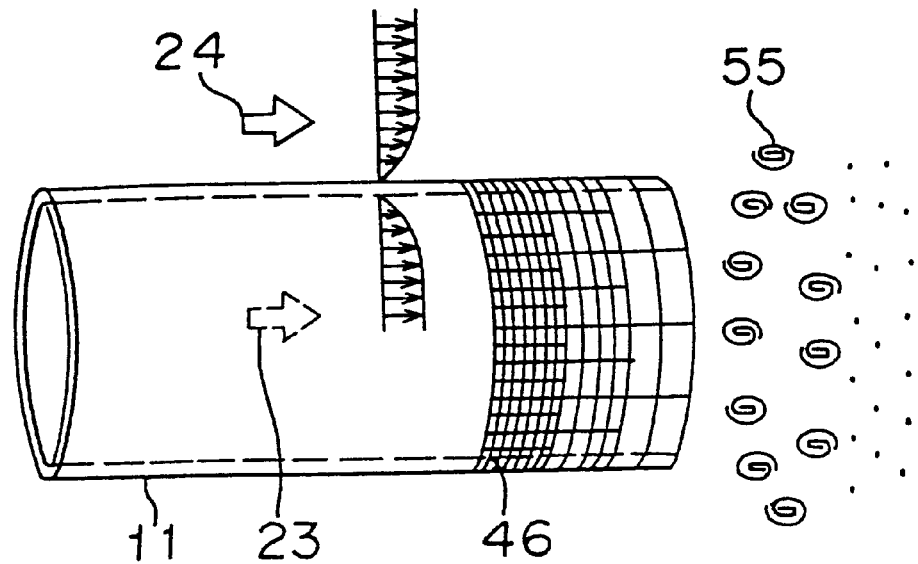
FIG. 21 is schematic view to show the flow rate measuring duct according to the eighth embodiment and to explain flow fashion offered by the duct in occurrence of deceleration.
Figure 22:
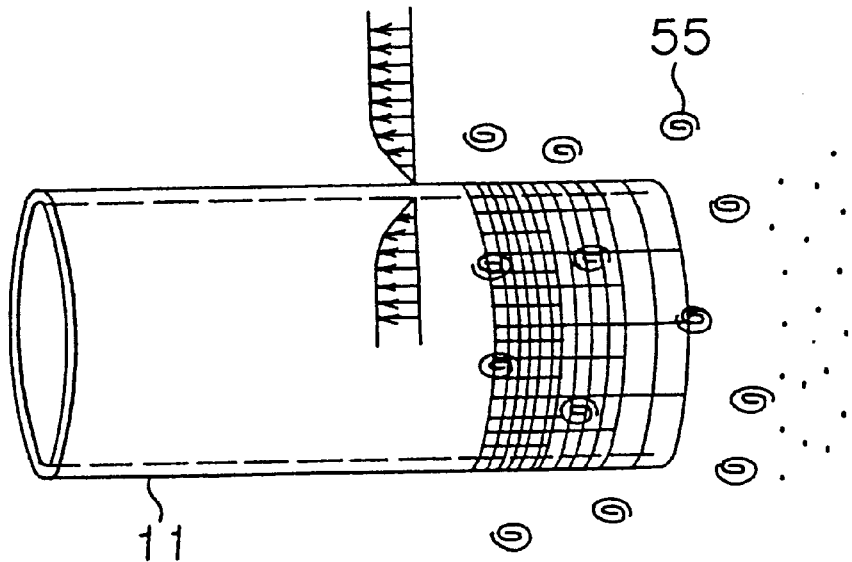
FIG. 22 is a schematic view to show the flow rate measuring duct according to the eighth embodiment and to explain flow fashion offered by the duct in occurrence of a backward current.

In FIGS. 20 through 22 is shown the flow rate measuring duct according to an eighth embodiment of the present invention, wherein the function of the duct is shown. In these Figures, reference numeral 46 designates an air-permeable member or a wire mesh 46, which are formed in a cylindrical shape, and which merges smoothly with the inner diameter and the outer diameter of the downstream wall of the flow rate measuring duct 11. The mesh 46 has squares thereof gradually enlarged in a three-stepwise pattern toward the downstream direction.

Before explaining the function of the duct in a pulsating flow, the function of the duct in a constant flow will be explained, referring to FIG. 20. The current 24 that has passed outside the flow rate measuring duct 11 and the current 23 that has passed through the flow rate measuring duct 11 merge together and become unstable when passing on the wall with the mesh 46 having gradually increased opening ratios toward the downstream direction. The merged currents directly produce the discrete vortexes 55 without producing the annular-shaped vortexes 90, and the discrete vortexes successively move downstream.

Now, the function of the duct in a pulsating flow in deceleration will be explained, referring to FIG. 21. Since the discrete vortexes 55 are promptly produced even in deceleration as in a constant flow, the magnitude of the discrete vortexes 55 is reduced. Since the provision of the mesh 46 reduces the occupied area of the discrete vortexes 55 in the vicinity of the outlet of the flow rate measuring duct 11, the current that has passed through the flow rate measuring duct 11 is hardly susceptible to a decrease in a flow velocity in comparison with the absence of the mesh 46. This means that the flow rate measuring device 1 can correctly measure a flow rate with the rectifying effect offered by the flow rate measuring duct 11 in a constant flow and a pulsating flow since a variation in the separation ratio of the currents in and outside of the flow rate measuring duct 11 is reduced.

Now, the function of the duct in occurrence of a backward current will be explained, referring to FIG. 22. When the flow rate measuring duct 11 is not formed with the mesh, the discrete vortexes 55 that have become massive in deceleration are carried on the flow. The discrete vortexes move upstream, being separated into portions outside and inside the flow rate measuring duct 11. The discrete vortexes that have come into the flow rate measuring duct 11 collide against the flow rate detector 12 to disturb the flow in the vicinity of the flow rate detector. This creates a problem in that an error in flow rate detection is produced since the flow rate detector 12 detects a variation in a flow velocity disturbed by the discrete vortexes 55 irrespective of the principal current. On the other hand, the flow rate measuring duct 11 with the mesh 46 provided can minimize the magnitude of the discrete vortexes 55 that generate and move upstream when the flow decelerates. As a result, even if the discrete vortexes 55 collide against the flow rate detector 12, irregular turbulence is reduced, allowing the flow rate measuring device 1 to correctly measure a flow rate.

As explained, the flow rate measuring device 1 is generally set so that a total flow rate of intake air into the flow rate measuring device 1 and an output from the flow rate detector 12 in the flow rate measuring duct 11 are prechecked with respect to a constant flow and that the flow rate measuring device grasps the relationship between each total flow rate and each output as a function. If a flow changes from a constant flow into a pulsating flow, a total flow rate of intake air into the flow rate measuring device 1 is estimated faced on an output from the flow rate detector 12. Since provision of the mesh 46 reduces the occupied area of the discrete vortexes 55 in the vicinity of the outlet of the flow rate measuring duct 11, the current 23 that has passed through the flow rate measuring duct 11 is hardly susceptible to a decrease in a flow velocity even if the flow changes into a pulsating flow. This arrangement can reduce a variation in the separation ratio between the current 23 that has passed through the flow rate measuring duct 11 and the current 24 that has passed outside the duct. Even if the discrete vortexes 55 move upstream by occurrence of a backward current, this arrangement can minimize the magnitude of the discrete vortexes. Thus, the flow rate measuring device 1 can correctly measure a flow rate with the rectifying effect offered by the flow rate measuring duct 11 in a constant flow, a pulsating flow and a pulsating flow with a backward current contained therein. This means that this arrangement is suited to a case with a backward current contained in a pulsating flow to some extent, in particular an induction system for an automobile internal combustion engine.

Although the squares of the mesh 46 changes in a three-stepwise pattern in the flow direction in this embodiment, the present invention is not limited to this arrangement. The mesh preferably has different sizes of squares as many as possible since the separation effect of the vortexes can be improved when the current 23 that has passed through the flow rate measuring duct 11 and the current 24 that has passed outside the flow rate measuring duct are gradually merged.

Embodiment 9

Figure 23:
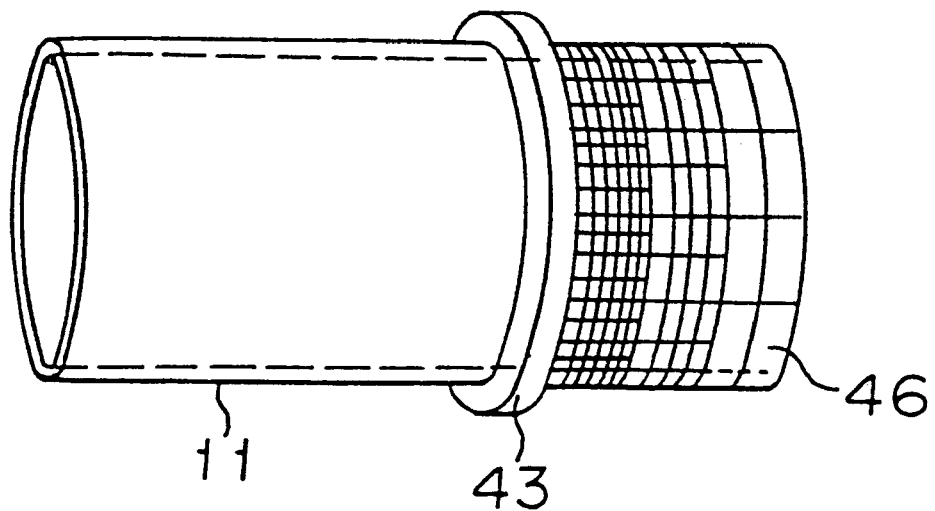
FIG. 23 is a perspective view of the flow rate measuring duct according to a ninth embodiment of the present invention.

In FIG. 23 is shown a perspective view of the flow rate measuring duct according to a ninth embodiment of the present invention. This embodiment can further enhance the effect offered by the mesh 46. In this embodiment, the projection 43 is provided on an outer wall of the flow rate measuring duct 11 upstream the mesh 46 to provide an abrupt change in the wall thickness of the duct 11. Even if the flow changes from a constant flow into a pulsating flow, the current 23 that has passed through the flow rate measuring duct 11 is hardly susceptible to a decrease in a flow velocity since the provision of the projection reduces the occupied area of the discrete vortexes 55 in the vicinity of the outlet of the flow rate measuring duct 11 as explained with respect to the provision of the notches 13 and the projection 43 according to the third embodiment. This arrangement can reduce a variation in the separation ratio between the current 23 that has passed through the flow rate measuring duct 11 and the current 24 that has passed outside the duct, in a constant flow and a pulsating flow. Even if the discrete vortexes move upstream by occurrence of a backward current, this arrangement can minimize the magnitude of the discrete vortexes 55 and cause the discrete vortexes to pass outside the duct. Thus, the flow rate measuring device 1 can correctly measure a flow rate with the rectifying effect by the flow rate measuring duct 11 in a constant flow, a pulsating flow and a pulsating flow with a backward current contained therein.

Detailed explanation of the function of the projection 43 will be omitted since the explanation with respect to the third embodiment is also applied to this embodiment.

Even if discontinuous projections, which are formed by cutting a ring-shaped projection into sections in the circumferential direction with respect to the longitudinal axis 18 of the flow rate measuring duct 11, are provided instead of the ring-shaped projection 43 shown in FIG. 23, similar effects can be offered as in the fourth embodiment.

Embodiment 10

Figure 24:
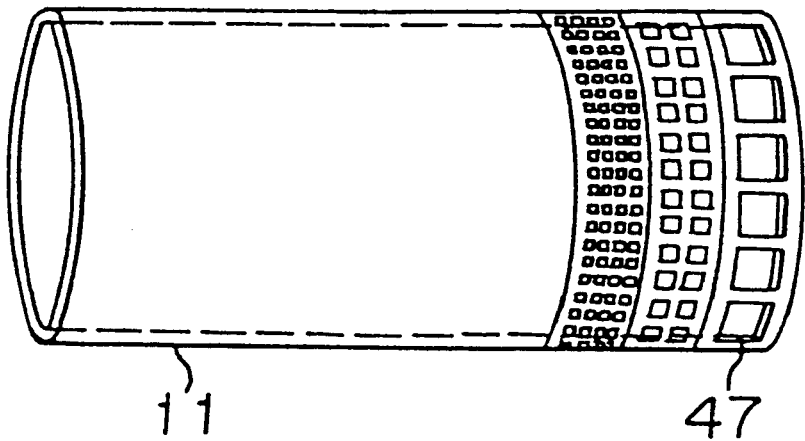
FIG. 24 is a perspective view of the flow rate measuring duct according to a tenth embodiment of the present invention.

In FIG. 24 is shown a perspective view of the flow rate measuring duct according to a tenth embodiment of the present invention. In this Figure, reference numeral 47 designates an air-permeable grid, which is formed with the flow rate measuring duct 11 as a one-piece construction. The grid has opening areas thereof gradually increased in a three-stepwise pattern toward the downstream direction.

Even if the grid 47 according to this embodiment is provided instead of the mesh 46 according to the eighth embodiment, similar effects can be offered. If the grid 47 is made of the same material as the duct, such as resin, in manufacture, a reduction in cost can be offered.

Embodiment 11

Figure 25:
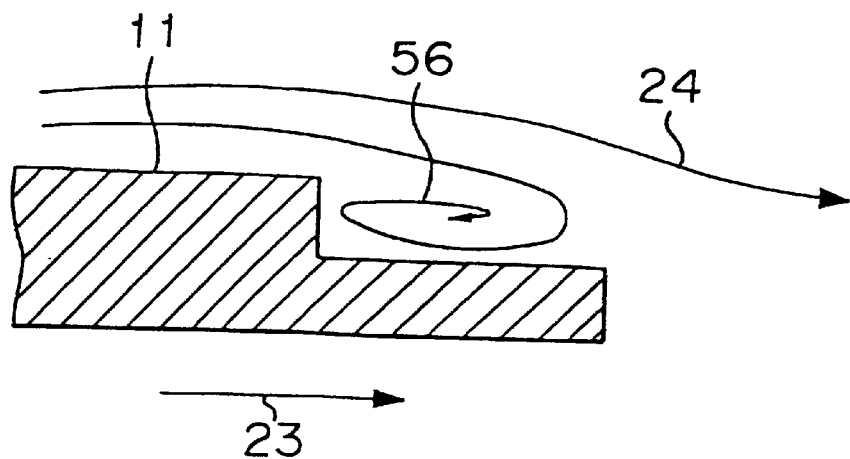
FIG. 25 is an enlarged cross-sectional view to show an essential portion of the flow rate measuring duct according to an eleventh of the present invention and to explain flow fashion offered by the duct.

In FIG. 25 is shown an enlarge perspective view of a leading portion of the downstream end of the flow rate measuring duct according to an eleventh embodiment of the present invention. In this embodiment, the outer wall of the downstream end of the flow rate measuring duct 11 with the notches 13, the through holes 45, the mesh 46 or the grid 47 formed therein is stepped to have a wall thickness thereof decreased in comparison with the wall thickness of the outer wall on the upstream side.

By this arrangement, the current 24 that passes between the outer wall of the flow rate measuring duct 11 and the inner wall of the principal current passage 10 separate from the stepped portion of the flow rate measuring duct 11 to produce the separation region 56. The discrete vortexes that are produced at the downstream end of the flow rate measuring duct 11 by the separation region 56 are sucked out toward outside to decrease the occupied area thereof in the vicinity of the outlet of the flow rate measuring duct 11. As a result, this arrangement can not only offer the rectifying effect by the flow rate measuring duct 11 but also reduce a variation in the separation ratio between the currents in and outside the flow rate measuring duct 11 in a constant flow and a pulsating flow. Even if the discrete vortexes move upstream by occurrence of a backward current, this arrangement can minimize the magnitude of the discrete vortexes and cause the discrete vortexes to pass outside the flow rate measuring duct 11. Thus, the flow rate measuring device 1 can correctly measure a flow rate with the rectifying effect offered by the flow rate measuring duct 11 in a constant flow, a pulsating flow and a pulsating flow with a backward current contained therein.

The stepped portion is not limited to include a single step and may include plural steps. The step portion may include three steps to match with the change in the squares of the mesh 46 of FIG. 20 or the grid 47 of FIG. 24, for instance. The provision of plural steps can reduce the wall thickness of the downstream portion of the duct with the notches 13 or the like toward the downstream direction to offer an advantage in that the currents in and outside the flow rate measuring duct 11 can be smoothly merged as explained with regard to the first embodiment. In this case, a larger number of the steps is preferable.

Embodiment 12

Figure 26:
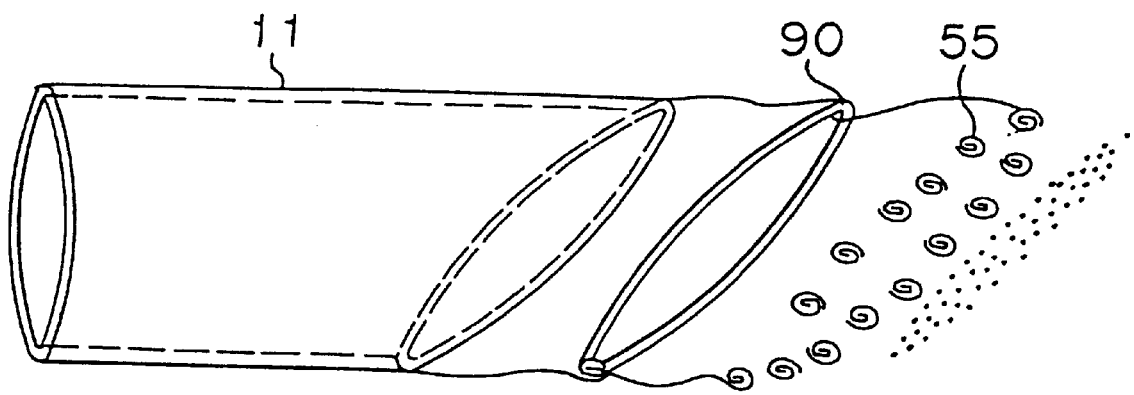
FIG. 26 is a schematic view to show the flow rate measuring duct according to a twelfth embodiment of the present invention and to explain flow fashion offered by the duct in a constant flow.

In FIG. 26 is shown the flow rate measuring duct according to a twelfth embodiment of the present invention, wherein the function of the duct is shown.

Although explanation of the first embodiment is made with respect to the case with five of the notches 13 as shown in FIG. 5, this embodiment is directed to a single notch. In this embodiment, the single notch is rovided by slantly cutting the downstream end of the flow rate measuring duct 11.

The function of the duct in this case will be explained. In a constant flow, the annular-shaped vortexes 90 that are generated from the rear flow behind the flow rate measuring duct 11 take a shape with different portions shifted in the flow direction so as to have an oval shape as in the first embodiment with five of the notches provided. The annular-shaped vortexes 90 having such a non-circular shape are unstable, are promptly separated in sections and collapse as the discrete vortexes 55.

Even in a pulsating flow and a pulsating flow with a backward current contained therein, the annular-shaped vortexes collapse into the discrete vortexes 55 in the basically same way as the first embodiment though a degree of effect is different. Explanation of the function in a pulsating flow and a pulsating flow with a backward current therein will be omitted.

The flow rate measuring device 1 according to this embodiment is set so that a total flow rate of intake air into the flow rate measuring device 1 and an output from the flow rate detector 12 in the flow rate measuring duct 11 are prechecked with respect to a constant flow and that the flow rate measuring device grasps the relationship between each total flow rate and each output as a function. If a flow changes from a constant flow into a pulsating flow, a total flow rate of intake air into the flow rate measuring device 1 is estimated based on an output from the flow rate detector 12. Since the provision of the slant downstream end of the flow rate measuring duct 11 reduces the occupied area of the discrete vortexes 55 in the vicinity of the outlet of the flow rate measuring duct 11, the current that has passed through the flow rate measuring duct 11 is hardly susceptible to a decrease in a flow velocity even if the flow changes into a pulsating flow. As a result, a variation in the separation ratio between the currents 23 and 24 in and outside the flow rate measuring duct 11 can be reduced in a constant flow and a pulsating flow. Even if the discrete vortexes 55 move upstream by occurrence of a backward current, this arrangement can minimize the magnitude of the discrete vortexes. Thus, the flow rate measuring device 1 can correctly measure a flow rate with the rectifying effect offered by the flow rate measuring duct 11 in a constant flow, a pulsating flow and a pulsating flow with a backward current contained therein. In accordance with this embodiment, the provision of the notch requires only to slantly cut the downstream end of the flow rate measuring duct 11, offering an advantage in that the manufacturing is easy and inexpensive.

Embodiment 13

Figure 27:
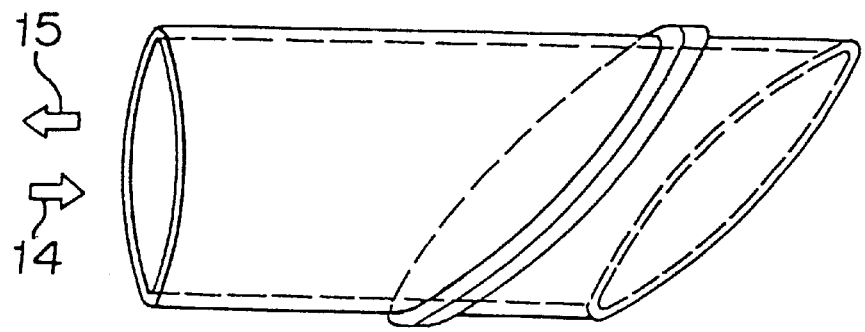
FIG. 27 is a perspective view of the flow rate measuring duct according to a thirteenth embodiment of the present invention.

The arrangement according to the twelfth embodiment may be combined with the provision of a ring-shaped projection 43 according to the third embodiment, offering effects similar to the third embodiment. The projection is provided in slant fashion or parallel with the slant downstream end as shown in FIG. 27 as a perspective view.

The projection may be replaced by the discontinuous projections 44 according to the fourth embodiment shown in FIG. 14.

Embodiment 14

Figure 28:
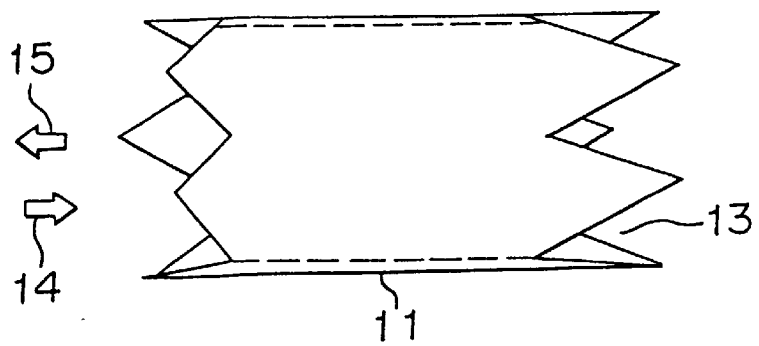
FIG. 28 is a perspective view of an example of the flow rate measuring duct according to a fourteenth embodiment of the present invention.
Figure 29:
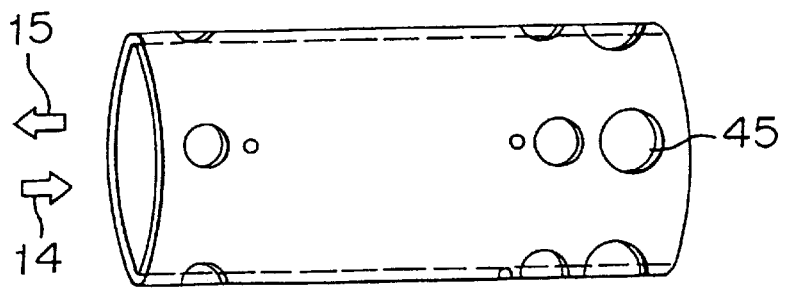
FIG. 29 is a perspective view of another example of the flow rate measuring duct according to the fourteenth embodiment.
Figure 30:
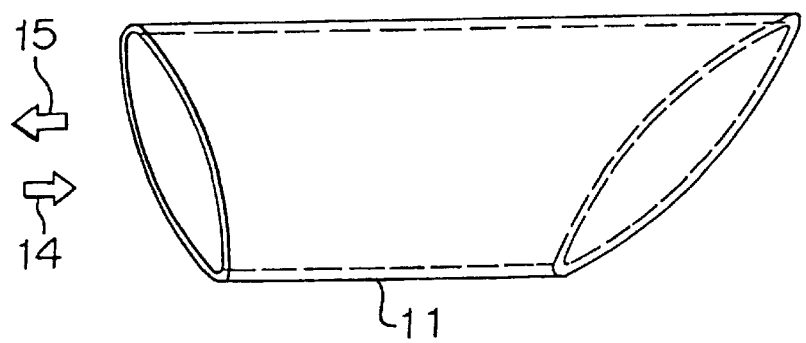
FIG. 30 is a perspective view of another example of the flow rate measuring duct according to the fourteenth embodiment.

Although explanation of the respective embodiments have been made with respect to a case wherein the flow rate measuring duct 11 has the downstream wall formed with the notches 13, the through holes 45, the mesh 46 or the grid 47, the flow rate measuring duct may also have an upstream wall formed with the notches 13, the through holes 45, the mesh 46 or the grid 47 in the case of a strong backward current as shown in FIGS. 28 through 30 for instance.

By this arrangement, a variation in the separation ratio between the currents in and outside the flow rate measuring duct 11 can be reduced with respect to flows in opposite directions since the notches 13 or the like on the downstream wall works for a constant flow or in deceleration while the notches 13 or the like on the upstream wall (a downstream wall with respect to a backward current) works in occurrence of a strong backward current.

The notches 13 in the upstream wall may have a shorter depth than the notches 13 in the downstream wall as shown in FIG. 28 since a backward current has a smaller magnitude and a lower frequency of occurrence than a forward current. The through holes 45 in the upstream wall may have a smaller size and a smaller number of rows in the flow direction of the duct 11 than the through holes in the downstream wall as shown in FIG. 29. When the upstream and downstream ends of the flow rate measuring duct 11 are slantly cut, the upstream end may have a gentler slant angle than the downstream end as shown in FIG. 30. The cutting directions of the upstream and downstream ends may be parallel or not be parallel each other.

The flow rate detector 12 is not limited to the arrangement shown in FIG. 4, which has been explained with respect to the first embodiment. The flow detector may have another arrangement. Even if the flow rate detector is a non-heat-sensitive flow rate sensor, such as a vane type sensor, a pressure detection type sensor, Karman's vortex type sensor and a corona discharge type sensor, similar effects can be obtained.

Even if the flow rate detector 12 can not detect a backward current, a variation in the separation ratio can be reduced in a constant flow and a pulsating flow, offering similar effects. Even if the vortexes move upstream by occurrence of a backward current, the magnitude of the vortexes can be decreased to reduce an error in flow rate detection.

Obviously, numerous modifications and variations of the present invention are possible in light of the above teachings. It is therefore to be understood that within the scope of the appended claims, the invention may be practiced otherwise than as specifically described herein.

What is claimed is:

1. A flow rate measuring device comprising:
   a flow rate measuring duct placed in a primary passage for a fluid, having a longitudinal axis, and a side wall extending substantially parallel to the primary passage; and
   a flow rate detector located in the flow rate measuring duct for measuring a flow rate of the fluid in the primary passage, wherein the side wall of the flow rate measuring duct has, at a downstream end, at least one of a notch extending along the longitudinal axis, a through hole having a central axis transverse to the longitudinal axis, and an air-permeable member having openings with respective central axes transverse to the longitudinal axis.

2. The flow rate measuring device according to claim 1, including one of a plurality of notches or through holes arranged in a circumferential direction of the flow rate measuring duct with respect to the longitudinal axis.

3. The flow rate measuring device according to claim 2, wherein the notches or through holes are uniformly spaced circumferentially.

4. The flow rate measuring device according to claim 3, including an odd number of the notches or through holes.

5. The flow rate measuring device according to claim 1, including a notch, the notch having a width gradually expanding in a downstream direction.

6. The flow rate measuring device according to claim 1, wherein the flow rate measuring duct has a portion with a wall thickness decreasing in a downstream direction and including the notch or the through hole.

7. The flow rate measuring device according to claim 6, wherein the flow rate measuring duct has a portion including an outer diameter decreasing in the downstream direction and including the notch or through hole.

8. The flow rate measuring device according to claim 6, wherein the flow rate measuring duct has a portion including an inner diameter increasing in the downstream direction and including the notch or through hole.

9. The flow rate measuring device according to claim 1, further comprising a projection on an outer wall of the flow rate measuring duct, upstream of the notch, through hole, or air-permeable member, the projection extending in a circumferential direction with respect to the longitudinal direction of the flow rate measuring duct.

10. The flow rate measuring device according to claim 1, including an air-permeable member having an air-permeable resistance decreasing toward a downstream direction.

* * * * *